US012307616B2

(12) United States Patent
Zoss et al.

(10) Patent No.: US 12,307,616 B2
(45) Date of Patent: May 20, 2025

(54) TECHNIQUES FOR RE-AGING FACES IN IMAGES AND VIDEO FRAMES

(71) Applicants: DISNEY ENTERPRISES, INC., Burbank, CA (US); ETH Zürich (Eidgenössische Technische Hochschule Zürich), Zürich (CH)

(72) Inventors: Gaspard Zoss, Zurich (CH); Derek Edward Bradley, Zurich (CH); Prashanth Chandran, Zurich (CH); Paulo Fabiano Urnau Gotardo, Zurich (CH); Eftychios Sifakis, Verona, WI (US)

(73) Assignees: Disney Enterprises, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 580 days.

(21) Appl. No.: 17/473,232

(22) Filed: Sep. 13, 2021

(65) Prior Publication Data
US 2023/0080639 A1    Mar. 16, 2023

(51) Int. Cl.
*G06T 19/20*    (2011.01)
*G06N 3/08*    (2023.01)
(Continued)

(52) U.S. Cl.
CPC ............... *G06T 19/20* (2013.01); *G06N 3/08* (2013.01); *G06T 7/149* (2017.01); *G06T 17/20* (2013.01);
(Continued)

(58) Field of Classification Search
CPC ...... G06N 3/0464; G06N 3/0475; G06N 3/08; G06N 3/094; G06T 17/00; G06T 17/20;
(Continued)

(56) References Cited

U.S. PATENT DOCUMENTS 10,504,267 B2 *  12/2019  Simons ............... G06V 40/171
10,614,623 B2 *   4/2020  D'Alessandro ......... G06T 13/40
(Continued)

FOREIGN PATENT DOCUMENTS

CN    101556699 A    10/2009
CN    105787974 A    7/2016
(Continued)

OTHER PUBLICATIONS

Markus Gross et al. "Production-Ready Face Re-Aging for Visual-Effects"; ACM Trans. Graph., vol. 41, No. 6, Article 237. Publication date: Dec. 2022 (Year: 2022).*
(Continued)

*Primary Examiner* — Ian L Lemieux
(74) *Attorney, Agent, or Firm* — Squire Patton Boggs LLP; Sarah Mirza

(57) ABSTRACT

Techniques are disclosed for re-aging images of faces and three-dimensional (3D) geometry representing faces. In some embodiments, an image of a face, an input age, and a target age, are input into a re-aging model, which outputs a re-aging delta image that can be combined with the input image to generate a re-aged image of the face. In some embodiments, 3D geometry representing a face is re-aged using local 3D re-aging models that each include a blend-shape model for finding a linear combination of sample patches from geometries of different facial identities and generating a new shape for the patch at a target age based on the linear combination. In some embodiments, 3D geometry representing a face is re-aged by performing a shape-from-shading technique using re-aged images of the face captured from different viewpoints, which can optionally be constrained to linear combinations of sample patches from local blendshape models.

13 Claims, 13 Drawing Sheets

(51) Int. Cl.
*G06T 7/149* (2017.01)
*G06T 17/20* (2006.01)
(52) U.S. Cl.
CPC ............. *G06T 2207/20081* (2013.01); *G06T 2207/20084* (2013.01); *G06T 2207/20212* (2013.01); *G06T 2207/30201* (2013.01); *G06T 2219/2021* (2013.01)
(58) Field of Classification Search
CPC ........... G06T 19/20; G06T 2207/20081; G06T 2207/20084; G06T 2207/20212; G06T 2207/20221; G06T 2207/30201; G06T 2210/64; G06T 2219/2021; G06T 5/005; G06T 7/149
See application file for complete search history.

(56) References Cited

U.S. PATENT DOCUMENTS

| | | | |
|---|---|---|---|
| 10,621,771 | B2 | 4/2020 | Matts et al. |
| 2006/0034542 | A1 | 2/2006 | Aoyama |
| 2008/0212894 | A1 | 9/2008 | Demirli et al. |
| 2008/0240489 | A1 | 10/2008 | Marugame |
| 2009/0028380 | A1 | 1/2009 | Hillebrand et al. |
| 2018/0018819 | A1 | 1/2018 | Hwang et al. |
| 2018/0365874 | A1* | 12/2018 | Hadap .................... G06N 3/045 |
| 2019/0034704 | A1* | 1/2019 | Qiu ....................... G06V 10/764 |
| 2021/0407153 | A1* | 12/2021 | Despois ............. G06Q 30/0631 |
| 2022/0084173 | A1* | 3/2022 | Liang ........................ G06T 5/50 |
| 2022/0172431 | A1* | 6/2022 | Abel ...................... G06N 3/045 |
| 2022/0198830 | A1* | 6/2022 | Li ..................... G06F 18/24133 |
| 2022/0309633 | A1* | 9/2022 | Davies ................ G06V 40/103 |
| 2023/0061875 | A1* | 3/2023 | Zhao ..................... G06T 19/006 |

FOREIGN PATENT DOCUMENTS

| | | | |
|---|---|---|---|
| CN | 109523463 | A | 3/2019 |
| CN | 109584327 | A | 4/2019 |
| CN | 110322394 | A * | 10/2019 |
| CN | 110348352 | A | 10/2019 |
| CN | 110852935 | A | 2/2020 |
| CN | 111652024 | A | 9/2020 |
| CN | 111798369 | A | 10/2020 |
| CN | 112002009 | A | 11/2020 |
| CN | 112883756 | A | 6/2021 |
| GB | 2602862 | A | 7/2022 |
| KR | 102266165 | B1 | 6/2021 |
| WO | 2021/171118 | A1 | 9/2021 |

OTHER PUBLICATIONS

Wang et al. "U-Net Conditional GANs for Photo-Realistic and Identity-Preserving Facial Expression Synthesis"; ACM Transactions on Multimedia Computing, Communications, and Applications vol. 15 Issue 3s Article No. 88pp. 1-23 https://doi.org/10.1145/3355397 (Year: 2019).*
GB Combined Search and Examination Report for application No. 2213089.2 dated Mar. 16, 2023.
GB Combined Search and Examination Report for Application No. 2213089.2 dated Nov. 27, 2023.
Alaluf et al., "Only a Matter of Style: Age Transformation Using a Style-Based Regression Model", http://arxiv.org/abs/2102.02754, ACM Trans. Graph., vol. 40, No. 4, Article 45, https://doi.org/10.1145/3450626.3459805, Aug. 2021, pp. 45:1-45:21.
Amberg et al., "Weight, Sex, and Facial Expressions: On the Manipulation of Attributes in Generative 3D Face Models", 2009, pp. 1-11.
Zhang et al., "The Unreasonable Effectiveness of Deep Features as a Perceptual Metric", http://arxiv.org/abs/1801.03924, 2018, pp. 1-14.
Despois et al., "AgingMapGAN (AMGAN): High-Resolution Controllable Face Aging with Spatially-Aware Conditional GANs", http://arxiv.org/abs/2008.10960, 2020, pp. 1-16.
Yao et al., "High Resolution Face Age Editing", http://arxiv.org/abs/2005.04410, 2020, pp. 1-26.
Or-El et al., "Lifespan Age Transformation Synthesis", http://arxiv.org/abs/2003.09764, 2020, pp. 1-27.
Tazoe et al., "Facial aging simulator considering geometry and patch-tiled texture", ACM SIGGRAPH 2012 Posters on—SIGGRAPH '12, http://dx.doi.org/10.1145/2342896.2343002, Aug. 5-9, 2012, 1 page.
Lin et al., "De-aging High-Resolution 3D Facial Models by Example-Driven Mesh Deformation", ACM SIGGRAPH 2012 Posters, Association for Computing Machinery, Aug. 5-9, 2012, 1 page.
Riaz et al., "Age Progression by Gender-Specific 3D Aging Model", Machine Vision and Applications, https://doi.org/10.1007/s00138-018-0975-2, 2017, 19 pages.
Majid et al., "Adult-child 3D backward face aging model (3D B-Fam)", J. Vis. Commun., vol. 72, https://doi.org/10.1016/j.jvcir.2020.102803, 2020, pp. 1-11.
Pham et al., "Semi-Supervised FaceGAN for Face-Age Progression and Regression with Synthesized Paired Images", Electronics 2020, vol. 9, No. 603, doi: 10.3390/electronics9040603, 2020, pp. 1-16.
Viazovetskyi et al., "StyleGAN2 Distillation for Feed-forward Image Manipulation", https://arxiv.org/abs/2003.03581, Oct. 22, 2020, pp. 1-18.
Digital Human, "Machine Learning for De-Aging", Retrieved from https://motuslab.org/f/machine-learning-for-de-aging, on Sep. 1, 2021, Jul. 2, 2020, 14 pages.
Duong et al., "Automatic Face Aging in Videos via Deep Reinforcement Learning", https://arxiv.org/pdf/1811.11082.pdf, Apr. 24, 2019, 10 pages.
Abdal et al., "StyleFlow: Attribute-Conditioned Exploration of StyleGAN-Generated Images Using Conditional Continuous Normalizing Flows", ACM Trans. Graph., vol. 40, No. 3, Article 21, https://doi.org/10.1145/3447648, arXiv:2008.02401, May 2021, pp. 1-22.
Angulu et al., "Age estimation via face images: a survey", EURASIP Journal on Image and Video Processing, vol. 12, https://doi.org/10.1186/s13640-018-0278-6, 2018, pp. 1-35.
Antipov et al., "Face aging with conditional generative adversarial networks", In 2017 IEEE International Conference on Image Processing (ICIP), https://doi.org/10.1109/ICIP.2017.8296650, 2017, pp. 2089-2093.
Duong et al., "Automatic Face Aging in Videos via Deep Reinforcement Learning", In 2019 IEEE/CVF Conference on Computer Vision and Pattern Recognition (CVPR), arXiv:1811.11082, 2019, pp. 10005-10014.
Fang et al., "Triple-GAN: Progressive Face Aging with Triple Translation Loss", In 2020 IEEE/CVF Conference on Computer Vision and Pattern Recognition Workshops (CVPRW), DOI 10.1109/CVPRW50498.2020.00410, 2020, pp. 3500-3509.
Gal et al., "SWAGAN:A Style-based Wavelet-driven Generative Model", https://arxiv.org/abs/2102.06108, 2021, pp. 1-13.
Georgopoulos et al., "Modeling of Facial Aging and Kinship: A Survey", Image Vis. Comput., vol. 80, Dec. 2018, pp. 58-79.
Goodfellow et al., "Generative Adversarial Nets", Advances in neural information processing systems, vol. 27, arXiv:1406.2661, 2014, pp. 2672-2680.
Hsu et al., "Wasserstein Divergence GAN With Cross-Age Identity Expert and Attribute Retainer for Facial Age Transformation", IEEE Access, vol. 9, https://doi.org/10.1109/ACCESS.2021, 2021, p. 39695-39706.
Huang et al., "When Age-Invariant Face Recognition Meets Face Age Synthesis:A Multi-Task Learning Framework", CVPR, arXiv:2103.01520, 2021, pp. 1-12.
Härkönen et al., "GANSpace:Discovering Interpretable GAN Controls", In Proc. NeurIPS, arXiv:2004.02546, 2020, 29 pages.
Karras et al., "Progressive Growing of GANs for Improved Quality, Stability, and Variation", In International Conference on Learning Representations, 2018, pp. 1-26.

(56) References Cited

OTHER PUBLICATIONS

Karras et al., "Training Generative Adversarial Networks with Limited Data", In Proc. NeurIPS, arXiv:2006.06676, 2020, 37 pages.

Karras et al., "A Style-Based Generator Architecture for Generative Adversarial Networks", In 2019 IEEE/CVF Conference on Computer Vision and Pattern Recognition (CVPR), 2019, pp. 4401-4410.

Karras et al., "Analyzing and Improving the Image Quality of StyleGAN", In 2020 IEEE/CVF Conference on Computer Vision and Pattern Recognition (CVPR), IEEE, 2020, pp. 8110-8119.

Kemelmacher-Shlizerman et al., "Illumination-Aware Age Progression", In 2014 IEEE Conference on Computer Vision and Pattern Recognition, https://doi.org/10.1109/CVPR.2014.426, 2014, pp. 3334-3341.

Kingma et al., "Adam: A Method for Stochastic Optimization", In 3rd International Conference on Learning Representations, ICLR 2015, Conference Track Proceedings, Yoshua Bengio and Yann LeCun (Eds.), http://arxiv.org/abs/1412.6980, May 7-9, 2015, pp. 1-15.

Li et al., "Continuous Face Aging via Self-estimated Residual Age Embedding", arXiv:2105.00020, 2021, pp. 1-14.

Liu et al., "A3GAN: An Attribute-Aware Attentive Generative Adversarial Network for Face Aging", IEEE Transactions on Information Forensics and Security, vol. 16, https://doi.org/10.1109/TIFS.2021.3065499, 2019, pp. 2776-2790.

Pandey et al., "Total Relighting: Learning to Relight Portraits for Background Replacement", ACM Transactions on Graphics (Proceedings SIGGRAPH), vol. 40, No. 4, Article 1, https://doi.org/10.1145/3450626.3459872, Aug. 2021, pp. 1:1-1:21.

Park et al., "Semantic Image Synthesis with Spatially-Adaptive Normalization", In Proceedings of the IEEE Conference on Computer Vision and Pattern Recognition, arXiv:1903.07291, 2019, pp. 1-19.

Ramanathan et al., "Computational Methods for Modeling Facial Aging: A Survey", J. Vis. Lang. Comput., vol. 20, No. 3, doi:10.1016/j.jvlc.2009.01.011, Jun. 2009, pp. 131-144.

Schroff et al., "FaceNet: A Unified Embedding for Face Recognition and Clustering", In Proceedings of the IEEE Conference on Computer Vision and Pattern Recognition (CVPR), 2015, pp. 815-823.

Shen et al., "Interpreting the Latent Space of GANs for Semantic Face Editing", In Proceedings of the IEEE/CVF Conference on Computer Vision and Pattern Recognition (CVPR), arXiv:1907.10786, 2020, pp. 1-12.

Shu et al., "Age progression: Current technologies and applications", Neurocomputing, vol. 208, https://doi.org/10.1016/j.neucom.2016.01.101, 2016, pp. 249-261.

Simonyan et al., "Very Deep Convolutional Networks for Large-Scale Image Recognition", In 3rd International Conference on Learning Representations, ICLR 2015, Conference Track Proceedings, Yoshua Bengio and Yann LeCun (Eds.), http://arxiv.org/abs/1409.1556, May 7-9, 2015, pp. 1-14.

Tov et al., "Designing an Encoder for StyleGAN Image Manipulation", arXiv:2102.02766, 2021, pp. 1-33.

Yang et al., "Learning Continuous Face Age Progression: A Pyramid of GANs", IEEE Trans. Pattern Anal. Mach. Intell., vol. 43, No. 2, https://doi.org/10.1109/TPAMI.2019.2930985, Feb. 2021, pp. 499-515.

Yao et al., "High Resolution Face Age Editing", arXiv:2005.04410, 2020, pp. 1-26.

Yu et al., "BiSeNet V2: Bilateral Network with Guided Aggregation for Real-time Semantic Segmentation", arXiv:2004.02147, 2020, pp. 1-16.

Zhang, Richard, "Making Convolutional Networks Shift-Invariant Again", In ICML, arXiv:1904.11486, 2019, 17 pages.

Zhang et al., "The Unreasonable Effectiveness of Deep Features as a Perceptual Metric", In 2018 IEEE/CVF Conference on Computer Vision and Pattern Recognition (CVPR), arXiv:1801.03924, 2019, pp. 1-14.

Zhu et al., "Unpaired Image-to-Image Translation using Cycle-Consistent Adversarial Networks", In Computer Vision (ICCV), 2017 IEEE International Conference, arXiv:1703.10593, 2017, 18 pages.

Examination Report dated Mar. 19, 2024, for New Zealand Patent Application No. 792263, 4 pages.

GB Combined Search and Examination Report for Application No. 2411365.6 dated Dec. 11, 2024.

\* cited by examiner

TECHNIQUES FOR RE-AGING FACES IN IMAGES AND VIDEO FRAMES

BACKGROUND

Technical Field

Embodiments of the present disclosure relate generally to computer science and computer graphics and, more specifically, to techniques for re-aging faces in images and video frames.

Description of the Related Art

Oftentimes, faces need to be digitally aged or de-aged in film productions and advertising, among other things. For example, the face of an actor could be aged or de-aged when the actor is playing a character whose age differs from an age of the actor, or for a particular scene that takes place when a character is at an older or younger age. As used herein, "re-aging" a face refers to either aging the face from a younger age to an older age or de-aging the face from an older age to a younger age.

One approach for re-aging faces in images or video frames is to manually re-age the faces by editing the images or video frames by hand. Alternatively, a three-dimensional (3D) re-aged face rig can be created by manually sculpting 3D geometry of the face that is captured using performance capture or keyframe animation techniques. The re-aged face rig can then be rendered from any desired viewpoint. However, when faces are manually re-aged in images or video frames, or using face rigs, the overall process of re-aging can be error-prone, tedious, and very time consuming.

Another approach for re-aging faces in images or video frames is to train an artificial neural network to automatically re-age faces in images or video frames that are input into the neural network. However, conventional neural networks oftentimes do not preserve the identities of faces that are being re-aged. As used herein, a "facial identity" refers to aspects of a facial appearance that are considered distinct and help differentiate one face from another face. When the identity of a face in an image or video frame is not preserved during re-aging, the re-aged face can look like a different person. In addition, conventional neural networks typically require inputs having specific characteristics, such as a frontal view of a face or a particular resolution. When input images or video frames do not satisfy the required characteristics, such neural networks do not generate realistic re-agings of faces.

As the foregoing illustrates, what is needed in the art are more effective techniques for re-aging faces in images and video frames.

SUMMARY

One embodiment of the present disclosure sets forth a computer-implemented method for re-aging a face included in a first image. The method includes generating, via a machine learning model, a second image based on (i) the first image that includes the face, (ii) an input age, and (iii) a target age, wherein the second image includes one or more differences from the first image. The method further includes combining the first image and the second image into a third image.

Another embodiment of the present disclosure sets forth a computer-implemented method for re-aging three-dimensional (3D) geometry representing a face. The method includes generating, via a machine learning model, a first image that includes a face at a target age based on a second image that includes the face at an input age. The method further includes deforming 3D geometry representing the face at the input age based on the first image to generate re-aged 3D geometry.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques enable images and video frames that include faces and 3D geometry representing faces to be automatically re-aged while preserving the identities of those faces more accurately than conventional re-aging techniques. In addition, the disclosed techniques for re-aging faces can be effective for input images and video frames with varying depths and positions of the head, as well as different head poses, changes in lighting conditions, and motions. These technical advantages represent one or more technological improvements over prior art approaches.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
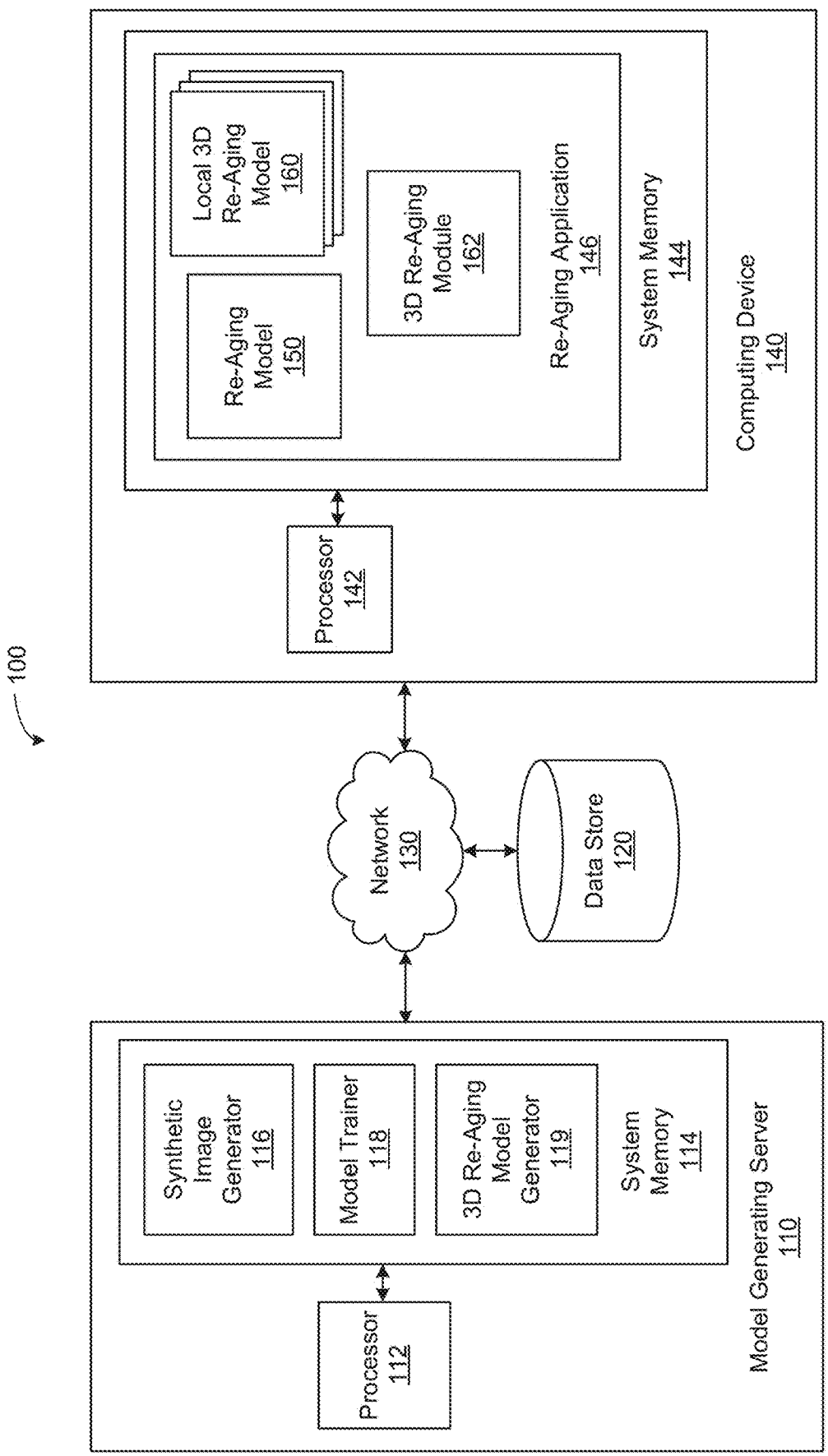
FIG. 1 illustrates a system configured to implement one or more aspects of the various embodiments.

FIG. 1 illustrates a system 100 configured to implement one or more aspects of the various embodiments. As shown, the system 100 includes a model generating server 110, a data store 120, and a computing device 140 in communication over a network 130, which may be a wide area network (WAN) such as the Internet, a local area network (LAN), or any other suitable network.

As shown, a synthetic image generator 116, a model trainer 118, and a 3D re-aging model generator 119 execute on a processor 112 of the model generating server 110 and is stored in a system memory 114 of the model generating server 110. The processor 112 receives user input from input devices, such as a keyboard, a mouse or a touchscreen. In operation, the processor 112 is the master processor of the model generating server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The system memory 114 of the model generating server 110 stores content, such as software applications and data, for use by the processor 112 and the GPU. The system memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the model generating server 110 shown herein is illustrative and that variations and modifications are possible. For example, the number of processors 112, the number of GPUs, the number of system memories 114, and the number of applications included in the system memory 114 may be modified as desired. Further, the connection topology between the various units in FIG. 1 may be modified as desired. In some embodiments, any combination of the processor 112, the system memory 114, and a GPU may be replaced with any type of virtual computing system, distributed computing system, or cloud computing environment, such as a public, private, or a hybrid cloud.

Figure 2:
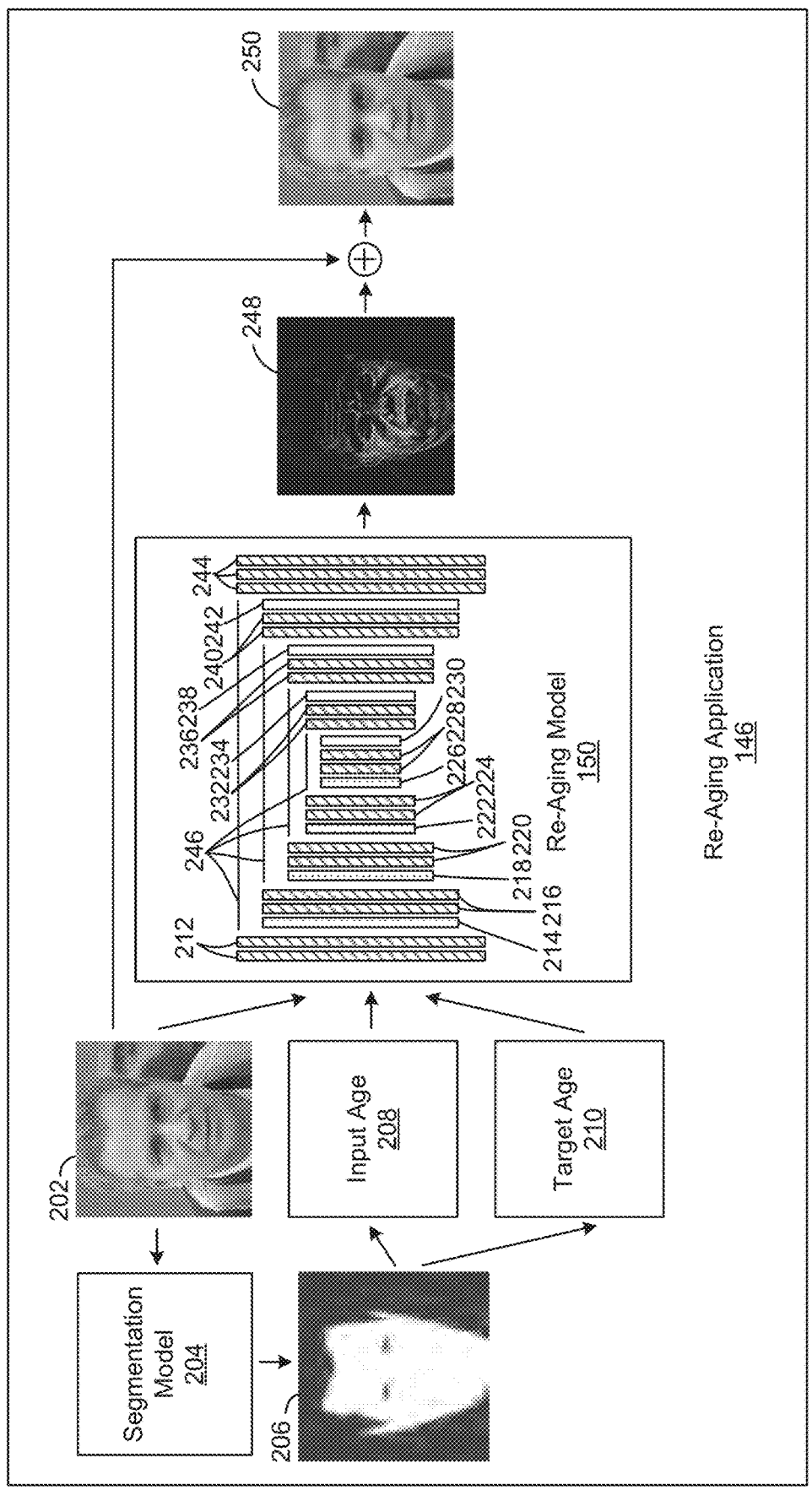
FIG. 2 illustrates how the re-aging model of FIG. 1 operates, according to various embodiments.
Figure 5A:
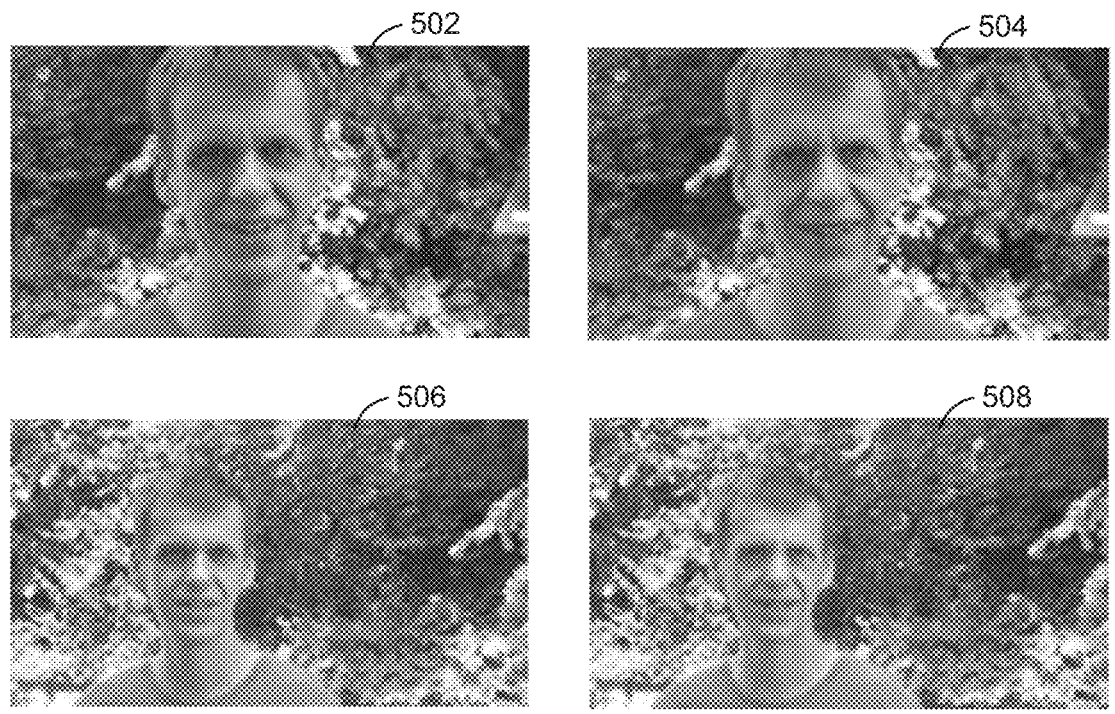
FIG. 5A illustrates exemplar images of a re-aged face at different depths and with different light conditions, according to various embodiments.
Figure 5B:
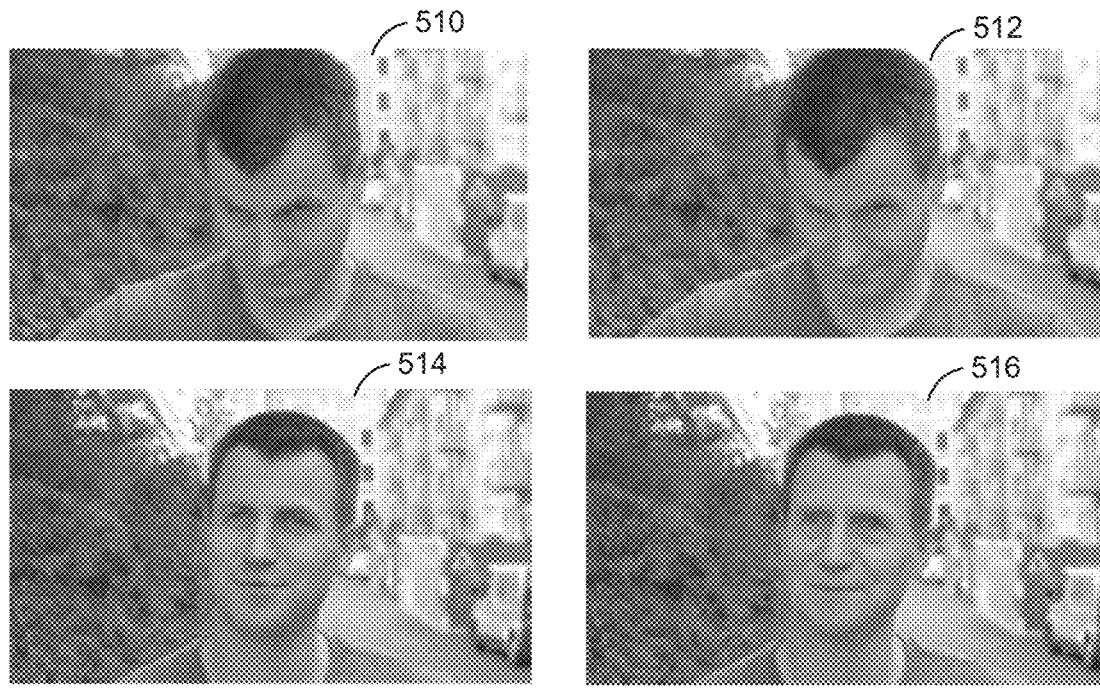
FIG. 5B illustrates exemplar images of a re-aged face having different head poses in the images, according to various embodiments.
Figure 6:
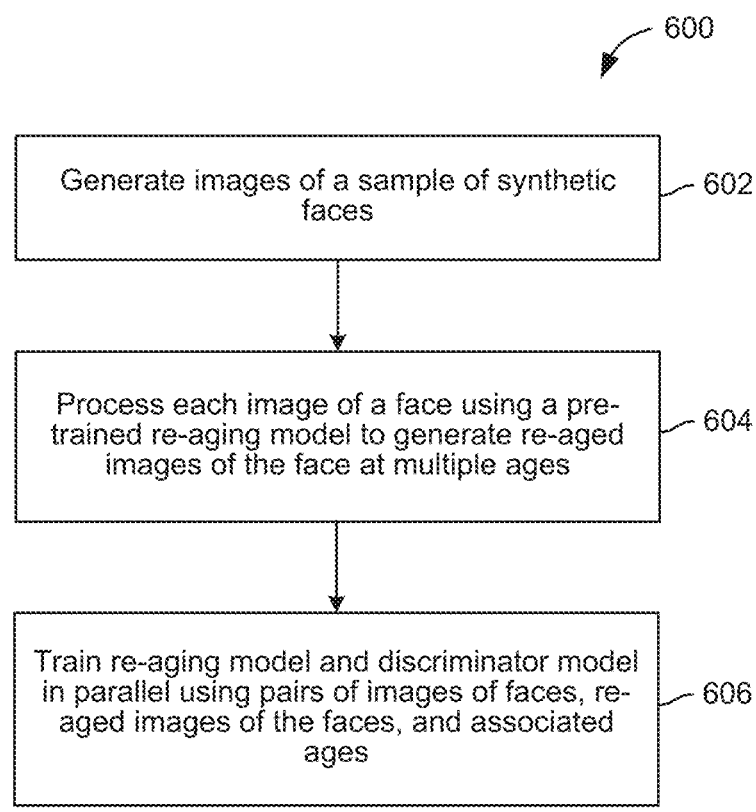
FIG. 6 sets forth a flow diagram of method steps for training a re-aging model, according to various embodiments.

The synthetic image generator 116 is an application that uses (1) a pre-trained synthetic face model to generate images of a number of synthetic facial identities, and (2) a pre-trained re-aging model to re-age the images of synthetic facial identities (or real facial identities), thereby generating images of the synthetic facial identities (or real facial identities) at a number of different ages, as described in greater detail in conjunction with FIGS. 2 and 6. The model trainer 118 is an application that is configured to train machine learning models, including a re-aging model 150. In some embodiments, the re-aging model 150 is an artificial neural network that is trained to generate images and videos of re-aged faces (also referred to herein as "re-aged images" and "re-aged videos") using the images of synthetic faces generated by the synthetic image generator 116, as described in greater detail below in conjunction with FIGS. 2-7. The 3D re-aging model generator 119 is an application that is configured to generate local 3D re-aging models 160. In some embodiments, each of the local 3D re-aging models 160 is a local subspace model, such as blendshape model, that can be used to deform 3D geometry representing a face to generate 3D geometry representing a re-aged face (also referred to herein as "re-aged 3D geometry"), as described in greater detail below in conjunction with FIGS. 8-13.

Training data and/or models, including the re-aging model 150 and the local 3D re-aging models 160, may be stored in the data store 120 and deployed in any suitable applications, such as a re-aging application 146. The re-aging application 146 utilizes the re-aging model 150 to generate images and videos of re-aged faces. In addition, the re-aging application 146 includes a 3D re-aging module 162 that utilizes the local 3D re-aging models 160 to generate 3D geometry representing re-aged faces. In some embodiments, the re-aging model 150 and the local 3D re-aging models 160 may not be included in the same application. The re-aging application 146 is described in greater detail below in conjunction with FIGS. 2-18.

In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the model generating server 110 may include the data store 120.

Illustratively, the re-aging application 146 that includes the re-aging model 150, the local 3D re-aging models 160, and the 3D re-aging module 162 is stored in a memory 144, and executes on a processor 142 of the computing device 140. Components of the computing device 140, including the memory 144 and the processor 142, may be similar to corresponding components of the model generating server 110.

More generally, the re-aging model 150 and the local 3D re-aging models 160 may be deployed, either alone or together, to any suitable applications. Further, the number of model generating servers and computing devices may be modified as desired. In addition, the functionality included in any of the applications may be divided across any number of applications or other software that are stored and execute via any number of devices that are located in any number of physical locations.

Re-Aging Faces in Images

FIG. 2 illustrates how the re-aging application 146 of FIG. 1 operates to re-age two-dimensional (2D images), according to various embodiments. As shown, the re-aging model 150 is an image-to-image translation model that takes as inputs an image 202 of a face, an input age 208, and a target age 210. By providing the input age 208 as an input, in addition to the target age 210, the re-aging model 150 can focus on the re-aging task, rather than estimating an age of the face in the input image 202. Given the input image 202 of the face, the input age 208, and the target age 210, the re-aging model 150 outputs a re-aging delta image 248 that can be combined with the input image 202 to generate an image 250 of a re-aged face (also referred to herein as the re-aged image 250).

As shown, the re-aging model 150 has a U-Net architecture, although a re-aging model can include any technically feasible architecture, such as an autoencoder architecture, in some embodiments. Illustratively, the U-Net re-aging model 150 includes two convolution layers 212 (e.g., 3×3 convolutions with rectified linear unit (ReLU) non-linear activations and a batch normalization, such as BatchNorm2d) followed by a max blur-pooling layer 214 (e.g., MaxBlurPool2D 2×) that downsamples an output of the convolution layers 212, three additional pairs of convolution layers 216, 220, and 224 that are followed by max blur-pooling layers 218, 222, and 226, respectively, as well as two output convolution layers 228 followed by a bilinear upsampling layer 230 (e.g., Bilinear upsample 2×) that upsamples an output of the convolution layers 228, three additional pairs of output convolution layers 232, 236, and 240 that are followed by bilinear upsampling layers 234, 238, and 242, respectively, and three additional output convolution layers 244. The max blur-pooling layers 214, 218, 222, and 226 accommodate for small shifts in the positions of wrinkles and other high frequency details, allowing the re-aging model 150 to output sharper re-aging delta images (e.g., re-aging delta image 248) that include more spatial detail than if the max blur-pooling layers 214, 218, 222, and 226 were not included in the U-Net re-aging model 150. In addition, the U-Net re-aging model 150 includes skip connections 246 that provide the output convolution layers 228, 232, 236, 240, 244 with direct access to input image features at high resolution. Experience has shown that the skip connections 246 help the U-Net re-aging model 150 to preserve an identity of the face in the input image 202 when generating the re-aging delta image 248. Further, the re-aging delta image 248 that is output by the re-aging model 150 only indicates RGB (red, green, blue) deltas (also referred to herein as "offsets") to the input image 202, which can also prevent substantial modifications to the identity of the face in the input image 202. Accordingly, the re-aging model 150 can substantially preserve the identity of the face in the input image 202.

In some embodiments, the U-Net re-aging model 150 takes as inputs a five-channel input tensor including the image 202 in RGB and two single-channel age maps, namely the input age 208 and the target age 210. Although described herein primarily with respect to providing the target age 210 as an input to the U-Net re-aging model 150, in other embodiments, the target age can be injected via Adaptive Instance Normalization (AdaIN) or other layer modulation techniques that are applied to modulate the target age. For example, AdaIN modulation of the skip connections 246 in the U-Net re-aging model 150 could be used for long term re-aging.

The input age 208 can be an age map that indicates the age associated with each pixel included in the image 202. Similarly, the target age 210 can be an age map that indicates the target age associated with each output pixel included in the re-aging delta image 248. The age maps can be single-channel images that are the same spatial resolution as the image 202. In some embodiments, pixel values in the age maps can be normalized, such as between 0 and 1, in order to represent a continuous age interval (e.g., year/100). In various embodiments, the target age map (i.e., the target age 210) does not need to be spatially constant and can, instead, include non-homogenous values to control different amounts of re-aging for different areas of the face. Similarly, the input age map (i.e., the input age 208) can include non-homogeneous values that create different re-aging effects (by altering the subjectively perceived input age), thereby providing users the ability to fine tune the re-aging result. Given the RGB image 202 and the input age 208 and the target age 210 in the form of age maps, the U-Net re-aging model 150 predicts per-pixel RGB deltas of the re-aging delta image 248. As used herein, a "delta" refers to a change in pixel color from the input image 202 of the face needed to generate the re-aged image 250 of the face at the target age. The re-aging delta image 248 can then be added on top of the input image 202 of the face to obtain the re-aged image 250.

Unlike other neural generators that require cropping, rotating, and re-scaling an input image into a canonical image grid that is spatially aligned with a neural generator, the re-aging model 150 does not require such modifications to re-age images (e.g., the image 202) having various viewpoints and expressions. As shown, the re-aging application 146 operates on unmodified input images and can also optionally apply a segmentation model 204 to generate a segmentation map 206 that indicates a skin part of the face in the image 202. The segmentation map 206 is used to control the images areas on which re-aging is applied (e.g., in case the actor is already wearing a wig and the hair appearance should not be altered further). Any technically feasible segmentation model can be used, including well-known models such as the BiSeNetV2 model. In some embodiments, based on the segmentation map 206, the re-aging application 146 only sets input age(s) and target age(s) for pixels in the input age 208 and target age 210 age maps, described above, that correspond to the skin part of the face. In such cases, the re-aging delta image 248 only includes RGB deltas for those pixels, and not other pixels that do not correspond to the skin part of the face, such as hair, clothing, the background, etc.

Figure 3:
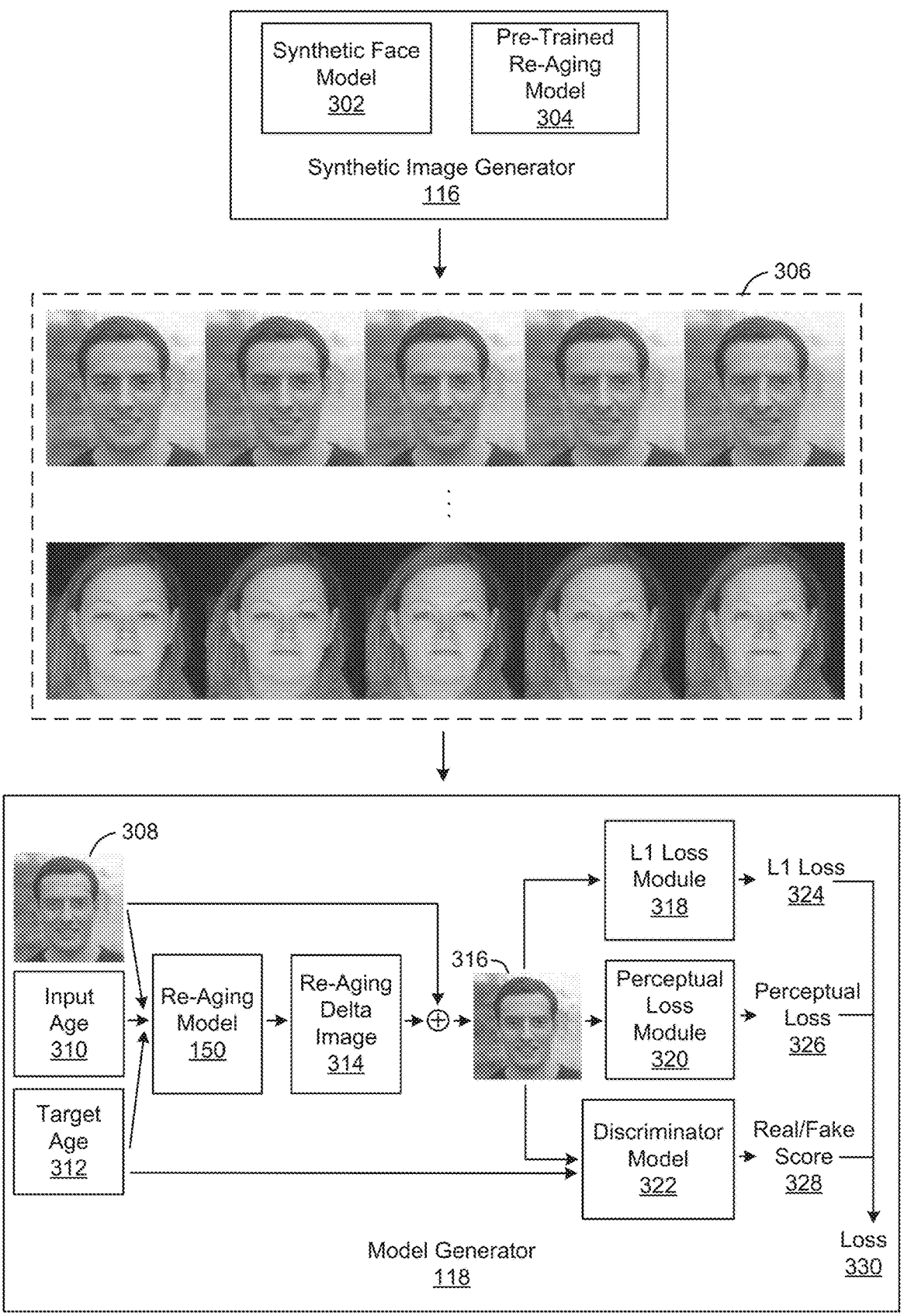
FIG. 3 illustrates an approach for training the re-aging model of FIG. 1, according to various embodiments.

FIG. 3 illustrates an approach for training the re-aging model 150 of FIG. 1, according to various embodiments. As shown, the re-aging model 150 is trained using supervised learning and a synthetically generated training data set 306 that includes a sample of different faces at various ages, which are labeled with those ages. The sample of different faces can include faces of different ethnicities and both male and female faces, among other things. For example, the training data set 306 could include images of 2000 synthetic facial identities, each with 12 different ages in the range of 18 to 85 years, providing a total of 144 training pairs of different ages per identity (including the null age progression).

As shown, in order to generate the training data set 306, the synthetic image generator 116 uses a pre-trained synthetic face model 302 to generate images of a number of synthetic facial identities. For example, the synthetic face model 302 could be a pre-trained machine learning model such as a style generative adversarial network (StyleGAN) or variant thereof. In other embodiments, images of a number of real faces may be used, rather than images of synthetic facial identities. The synthetic image generator 116 then applies a pre-trained re-aging model 304 to re-age the images of synthetic facial identities (or real facial identities), thereby generating images of the synthetic facial identities (or real facial identities) at a number of different ages that are included in the training data set 306. For example, the pre-trained re-aging model 304 could be another machine learning model such as a Style-based Age Manipulation (SAM) model or variant thereof that is used to traverse the latent space of a pre-trained generative model (such as StyleGAN) along a path that is steered by a pre-trained age predictor under the combined influence of identity consistency constraints. By following such a traversal both forwards and backwards in time, a continuous age progression for a particular facial identity can be generated. The foregoing process can then be repeated for any number of facial identities to generate the training data set 306. In some other embodiments, other traversal techniques may be used alone or in conjunction with SAM to, e.g., capture other aging effects such as the graying of hair. In yet further embodiments, the images of synthetic facial identities can be re-aged in any technically feasible manner, including manually, to create the training data set 306.

It should be noted that the pre-trained re-aging model 304 cannot be used by itself to re-age images of faces, because conventional re-aging models do not preserve the identities of faces that are re-aged. Nevertheless, the pre-trained re-aging model 304 can generate re-aged synthetic images that capture the semantics of the aging process nearly as convincingly as real images of aging faces. Accordingly, the images of synthetic facial identities at different ages that are generated using the pre-trained re-aging model 304 can be included in the training data set 306 that is used to train the re-aging model 160.

Given the training data set 306, the model trainer 118 trains the re-aging model 150 using pairs of images of a facial identity at different ages and a loss function that includes a combination of an L1 loss, a perceptual loss, and an adversarial loss. During training, an image 308 of a face, an input age 310, and a target age 312 are input into the re-aging model 150. Then, an image 316 of a re-aged face (also referred to herein as the re-aged image 316), which is generated by combining a re-aging delta image 314 output by the re-aging model 150 with the input image 308, is used to compute a loss 330 for training the re-aging model 150. This process can be repeated for other pairs of images including synthetic faces and re-aged versions of those faces in the training data set 306.

As shown, the loss 330 can combine an L1 loss 324 generated by an L1 loss module 318, a perceptual loss 326 generated by a perceptual loss module 320, and a real/fake score 328 (also referred to herein as the "adversarial loss") that is generated using a discriminator model 322. The L1 loss 324 is a score computed based on a difference between the re-aged image 316 that includes the re-aged face at the target age 312 and a corresponding image from the training data set 306 of the same face at the target age 312.

The perceptual loss 326 is a score that is computed based on a difference, in a feature space, between the re-aged image 316 that includes the re-aged face at the target age 312 and the corresponding image from the training data set 306 of the face at the target age 312. To compute the perceptual loss 326, the model trainer 118 can input the re-aged image 316 and the corresponding image from the training data set 306 into one or more layers of a pre-trained model (not shown) that output features, and then compare those features to determine a difference in the feature space. Experience has shown that the perceptual loss 326 can help to better reproduce the appearance and structure of the target training images, without blurring details. In some embodiments, the perceptual loss is the VGG variant of the learned perceptual image patch similarity (LPIPS) perceptual loss, which compares features at different scales of the VGG network. Other perceptual losses may be used in some embodiments.

The real/fake score 328 is generated by a discriminator model 322 that is trained in parallel with the re-aging model 150 to classify images of re-aged faces (e.g., re-aged image 316) generated by combining a re-aging delta image (e.g., re-aging delta image 314) output by the re-aging model 150 with an input image (e.g., image 308) as being real or fake. The real/fake score 328 is an adversarial loss that provides additional adversarial supervision to improve the realism of output generated by the re-aging model 150. In some embodiments, the discriminator model 322 can include a number of convolution layers (e.g., 3×3 convolutions with ReLU non-linear activations and a batch normalization, such as BatchNorm2d) that are each followed by a max blur-pooling layer 214 (e.g., MaxBlurPool2D 2×) for downsampling. For example, the discriminator model 322 could include a three-layer convolutional network with ReLU activations, and a fully connected layer that flattens and reduces an output of the final layer of the convolutional network into the real/fake score 328. As shown, the discriminator model 322 takes as input the re-aged image 316 and (optionally) the target age 312 (e.g., a target age map), which can be concatenated together in some embodiments. The task of the discriminator model 322 is to judge whether or not the re-aged image 316 generated by the re-aging model 150 looks consistent with the target age 312 given the training data set 306. The discriminator model 322 is trained alongside the re-aging model 150. During training, sample images from the training data set 306 at the target age 312 are provided to the discriminator model 322 as "real" examples and images generated by the re-aging model 150 are provided as "fake" examples in some embodiments. In some embodiments, real images with incorrect age maps can also be provided to the discriminator model 322 as additional "fake" examples. After training, the discriminator model 322 can be discarded, because only the re-aging model 150 is required to re-age images.

More formally, let I and O denote an input-output image pair in the training data set 306 and $a_i$ and $a_o$ be known age labels in the training data, and let $$\tilde{O} = M(I, a_i, a_o) \quad (1)$$

denote the re-aging output of the re-aging model 150, denoted by M. Then, the re-aging model 150 can be trained using a combination of L1, perceptual, and adversarial losses, $$\mathcal{L} = \lambda_{L1} \mathcal{L}_{L1}(\tilde{O}, O) + \quad (2)$$

$$\lambda_{LPIPS} \mathcal{L}_{LPIPS}(\tilde{O}, O) + \quad (3)$$

$$\lambda_{Adv} \mathcal{L}_{Adv}(\tilde{O}, a_o), \quad (4)$$

using, e.g., the VGG variant of the LPIPS perceptual loss, described above. In equations (2)-(4), $z<_{L1}$ is the L1 loss, $z<_{LPIPS}$ is the LPIPS perceptual loss, $z<_{Adv}$ is the adversarial loss, and $\lambda_{L1}$, $\lambda_{LPIPS}$, and $\lambda_{Adv}$ are weights for each of those losses.

In some embodiments, the model trainer 118 trains the re-aging model 150 using pairs of images of the same facial identity for different ages, going in both the older and the younger directions. In such cases, the input and target ages can be age maps that are filled with spatially uniform age values (i.e., the segmentation model 204 is not used during training). In addition, color jitter and slight rotations can be added to both the source and target images, and those images can also be randomly cropped. Experience has shown that using crops of 512×512 pixels provides a good tradeoff between batch size and context. During training, parameters of the re-aging model 150 and the discriminator model 322 can be optimized using the Adam optimization algorithm with a learning rate of 0.0001, a batch size of 32 and $\lambda_{L1}=1.0$, $\lambda_{LPIPS}=1.0$, and $\lambda_{Adv}=0.1$ in some embodiments.

Although described herein primarily with respect to images, techniques disclosed herein can also be used to re-age videos. For example, in some embodiments, a video can be re-aged frame-by-frame using the re-aging model 150, described above, because each frame of a video is also an image. In other embodiments, a re-aging model may be trained to take multiple frames of a video (e.g., a window of frames) as input. In some embodiments, to train a re-aging model that can re-age videos, the loss function that is minimized during training can further include a loss that penalizes temporal inconsistency so that different frames of a video are re-aged in a consistent manner. For example, the loss that penalizes temporal inconsistency could be an L1 loss under motion, or some other loss that constrains re-aged frames of a video to be consistent under motion between frames of the video. In some embodiments, various video processing techniques, such as optical flow with temporal smoothing, can be applied to remove artifacts, such as flickering, that appears in re-aged videos.

Figure 4:
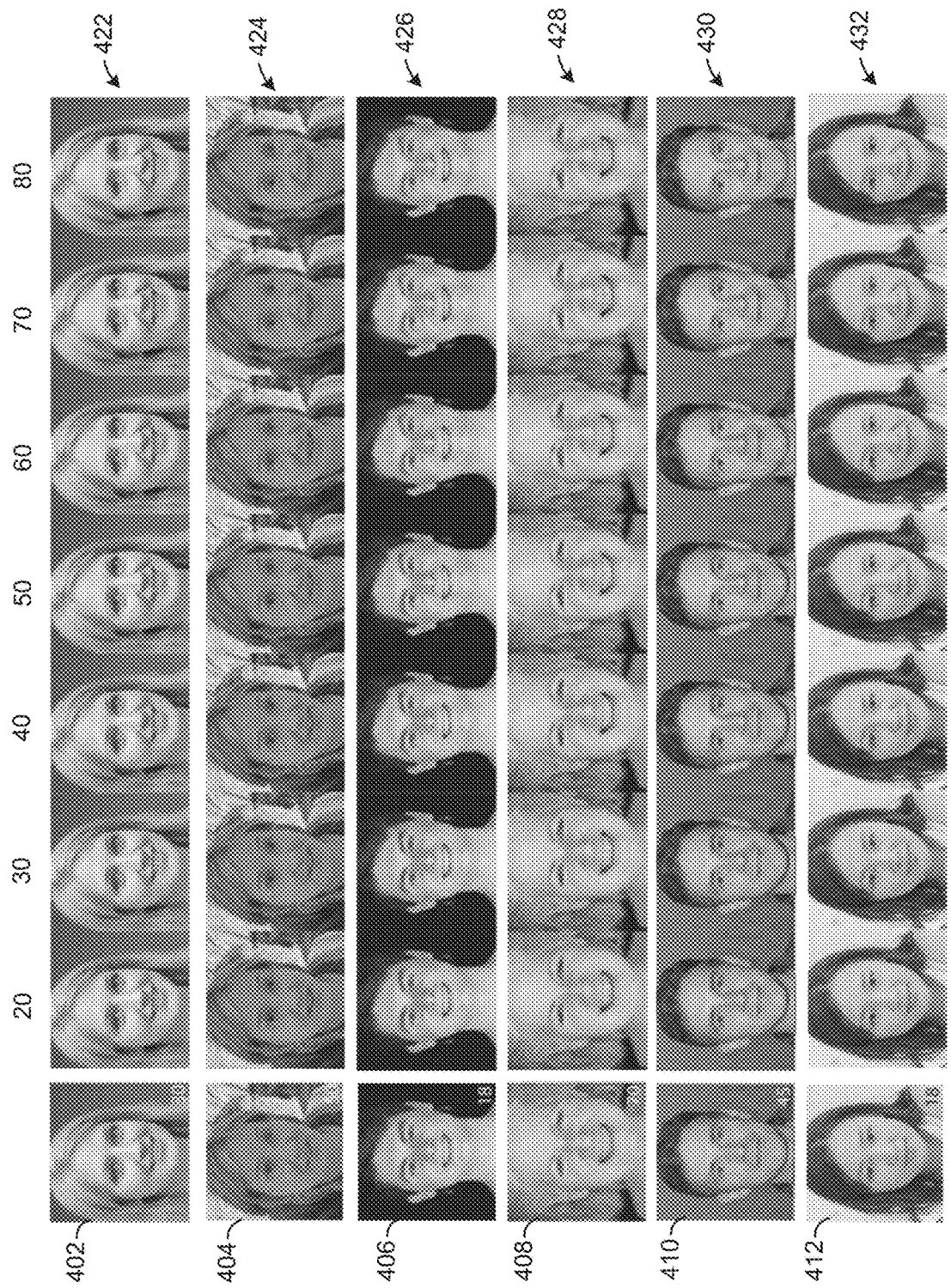
FIG. 4 illustrates exemplar images of re-aged faces, according to various embodiments.

FIG. 4 illustrates exemplar images of re-aged faces, according to various embodiments. As shown, images of faces 402, 404, 406, 408, 410, and 412 have been re-aged using the re-aging model 150 to generate re-aged image sets 422, 424, 426, 428, 430, and 432, each including re-aged images of faces at various ages from 20 years old to 80 years old. Illustratively, the re-aged image sets 422, 424, 426, 428, 430, and 432 appear realistic and preserve the facial identities of the input images 402, 404, 406, 408, 410, and 412, respectively, for both increasing and decreasing ages. Experience has shown that the re-aging model 150 is better at preserving facial identities than some conventional neural networks, as measured via an identity loss (distance) between the original and re-aged images computed using a pre-trained face recognition network. Further, the age progression in the re-aged image sets 422, 424, 426, 428, 430, and 432 is relatively smooth and temporally continuous.

FIG. 5A illustrates exemplar images of a re-aged face at different depths and with different light conditions, according to various embodiments. As shown, images 502 and 506 that include a face at different depths, and with different lighting conditions, have been re-aged using the re-aging model 150 to generate re-aged images 504 and 508, respectively. FIG. 5B illustrates exemplar images of a re-aged face having different head poses in the images, according to various embodiments. Illustratively, images 510 and 514 that include a face with different head poses have been re-aged using the re-aging model 150 to generate re-aged images 512 and 516, respectively. As shown in FIGS. 5A-B, the re-aging model 150 generates relatively consistent re-aging results and can handle varying depths and positions of the head in images, as well as different head poses and changes in lighting conditions. In addition, experience has shown that the re-aging model 150 works well even when some motion effects such as blur are present in images or frames of a video. As a result, images and video frames of faces that are being re-aged do not need to be pre- or post-processed, such as by pre-sharpening or post-applying blur effects.

FIG. 6 sets forth a flow diagram of method steps for training a re-aging model, according to various embodiments. Although the method steps are described in conjunction with the systems of FIGS. 1-3, persons of ordinary skill in the art will understand that any system configured to perform the method steps, in any order, is within the scope of the present disclosure.

As shown, a method 600 begins at step 602, where the synthetic image generator 116 generates images of a sample of synthetic faces. As described, in some embodiments, the synthetic image generator 116 applies a pre-trained synthetic face model (e.g., the synthetic face model 302) to generate images of a number of synthetic facial identities. For example, the synthetic face model could be a StyleGAN model, and a number of random inputs into the StyleGAN model can be used to generate the images of synthetic facial identities. In other embodiments, images of a number of real faces may be used, rather than images of synthetic facial identities.

At step 604, the synthetic image generator 116 processes each image of a face using the pre-trained re-aging model 304 to generate re-aged images of the face at multiple ages. As described, in some embodiments, the model trainer 118 uses a pre-trained re-aging model, such as a SAM model, to traverse the latent space of a pre-trained facial image generator along a path that is steered by a pre-trained age predictor under the combined influence of identity consistency constraints to generate re-aged images of the face at multiple ages.

At step 606, the model trainer 118 trains the re-aging model 150 and the discriminator model 322 in parallel using pairs of images of faces, re-aged images of those faces, and associated ages. As described, in some embodiments, the re-aging model 150 can include a U-Net architecture. The model trainer 118 trains the re-aging model 150 using pairs of images of the same facial identity at different ages and a loss function that includes a combination of an L1 loss, a perceptual loss, and an adversarial loss that is generated by the discriminator model 322 trained alongside the re-aging model 150, as described above in conjunction with FIG. 3.

Figure 7:
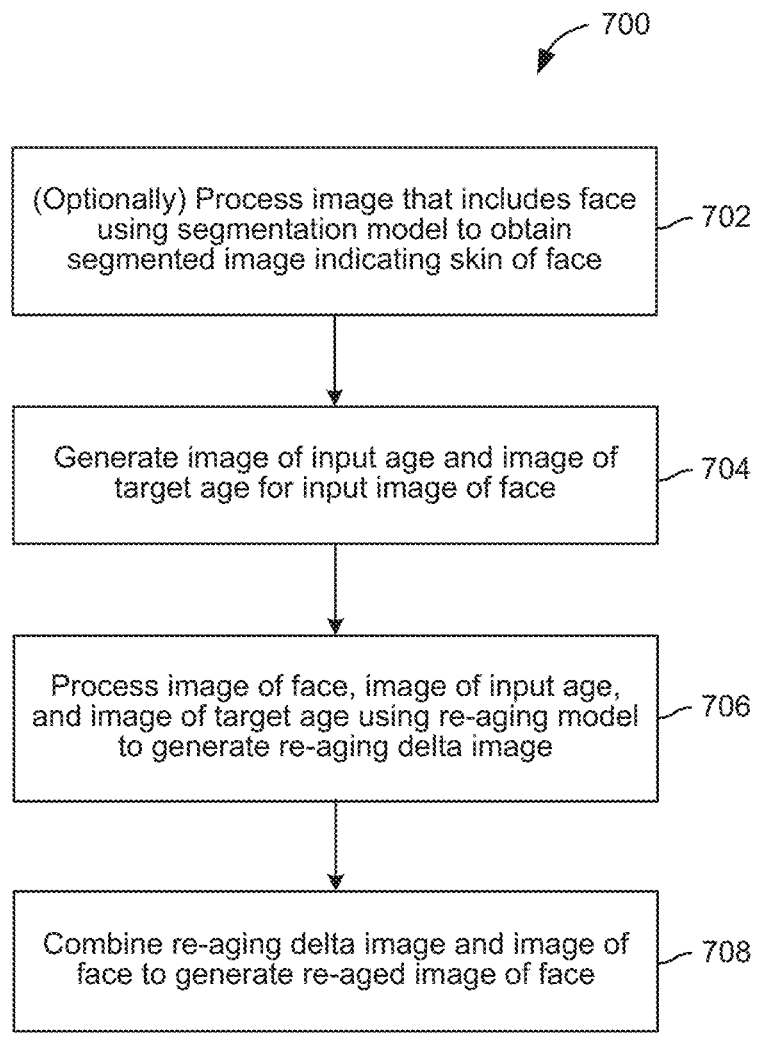
FIG. 7 sets forth a flow diagram of method steps for re-aging an image of a face, according to various embodiments.

FIG. 7 sets forth a flow diagram of method steps for re-aging an image of a face, according to various embodiments. Although the method steps are described in conjunction with the systems of FIGS. 1-2, persons of ordinary skill in the art will understand that any system configured to perform the method steps, in any order, is within the scope of the present disclosure.

As shown, a method 700 begins at step 702, where the re-aging application 146 optionally processes an input image that includes a face using the segmentation model 204 to obtain a segmented image indicating skin of the face. The input image can be specified by a user in some embodiments. Any technically feasible segmentation model can be applied to segment the input image, including well-known models such as the BiSeNetV2 model.

At step 704, the re-aging application 146 generates an image of an input age (e.g., input age 208) and an image of a target age (e.g., target age 210) for the input image of the face. As described, in some embodiments, the image of the input age and the image of the output age can be age maps having a same dimension as the input image and including pixels whose values indicate input and target ages for those pixels, respectively. Optionally, only pixels corresponding to the skin of the face, as indicated by the segmented image generated at step 702, are set. Further, the age values included in the image of the input age and the image of the output age can be non-homogenous to control different amounts of re-aging for different areas of the face.

At step 706, the re-aging application 146 processes the image of the face, the image of the input age, and the image of the target age using the re-aging model 150 to generate a re-aging delta image (e.g., the re-aging delta image 248). As described, in some embodiments, the re-aging model 150 is a U-Net model that is trained to take as inputs the image of the face, the image of the input age, and the image of the target age. Given such inputs, the re-aging model 150 outputs a re-aging delta image that includes RGB deltas for each pixel corresponds to skin of the face.

At step 708, the re-aging application 146 combines the re-aging delta image and the original image of the face to generate a re-aged image of the face (e.g., the re-aged image 250). As described, in some embodiments, RGB values in the re-aging delta image can be added to RGB values in the input image to obtain the re-aged image of the face.

Three-Dimensional Re-Aging of Faces

Figure 8:
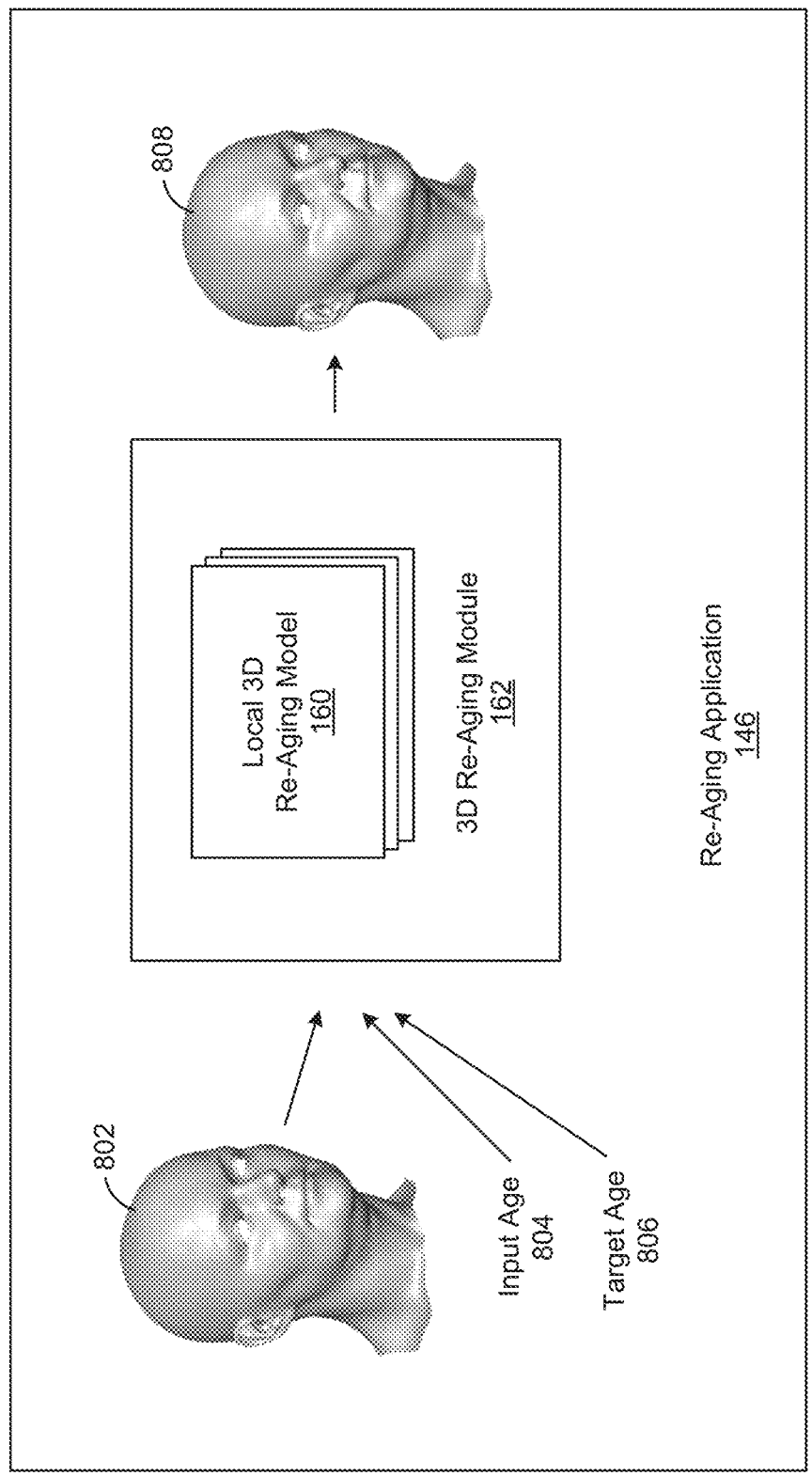
FIG. 8 illustrates how the 3D re-aging module of FIG. 1 operates, according to various embodiments.

FIG. 8 illustrates how the 3D re-aging module 162 of FIG. 1 operates, according to various embodiments. As shown, the 3D re-aging module 162 receives 3D geometry 802 representing a face, an input age 804 associated with the 3D geometry 802, and a target age 806. The 3D re-aging module 162 divides the 3D geometry 802 into patches, re-ages each of those patches using a corresponding local 3D re-aging model 160, and combines the re-aged patches to generate re-aged geometry 808.

Patches can have any technically feasible shape (e.g., square, rectangular, random continuous portions) and size, and neighboring patches may partially overlap in some embodiments. Each of the local 3D re-aging models 160 is generated based on sample patches of re-aged geometries associated with different facial identities, as discussed in greater detail below in conjunction with FIG. 9. Each local 3D re-aging model 160 is a subspace model for localized aging deformations. In some embodiments, each local 3D re-aging model 160 is a blendshape model that uses sample patches from re-aged geometries of different facial identities (e.g., 15 facial identities) at various ages as blend shapes that can be linearly combined to generate a new shape for the patch at a target age. In such cases, the 3D re-aging module 162 can determine, for each patch of the input geometry 802, a linear combination of the sample patches having the input age 804 that matches a corresponding patch of the input geometry 802. The match can be identified in any technically feasible manner, such as based on surface curvature or silhouettes in images of the patches, or other measures used in fitting 3D geometry models. Then, the 3D re-aging module 162 can take the same linear combination of re-aged sample patches that are associated with the target age 806 to generate a re-aged version of the patch of the input geometry 802 at the target age 806. The re-aged version can be an older or a younger version of the patch, and some embodiments can use two patch blendshape models, one for the younger version and one for the older version. In such cases, to age a new 3D geometry, each local patch can be projected into a young basis of blend shapes, resulting in a set of basis weights, and the same weights can be applied to an old basis of blend shapes to generate the aging shape offsets for the patch, and vice versa to de-age a new 3D geometry. Thereafter, the re-aging module 162 can combine the re-aged patches to generate the re-aged geometry 808. The re-aged geometry 808 can then be used to render images of the re-aged face, among other things.

Figure 9:
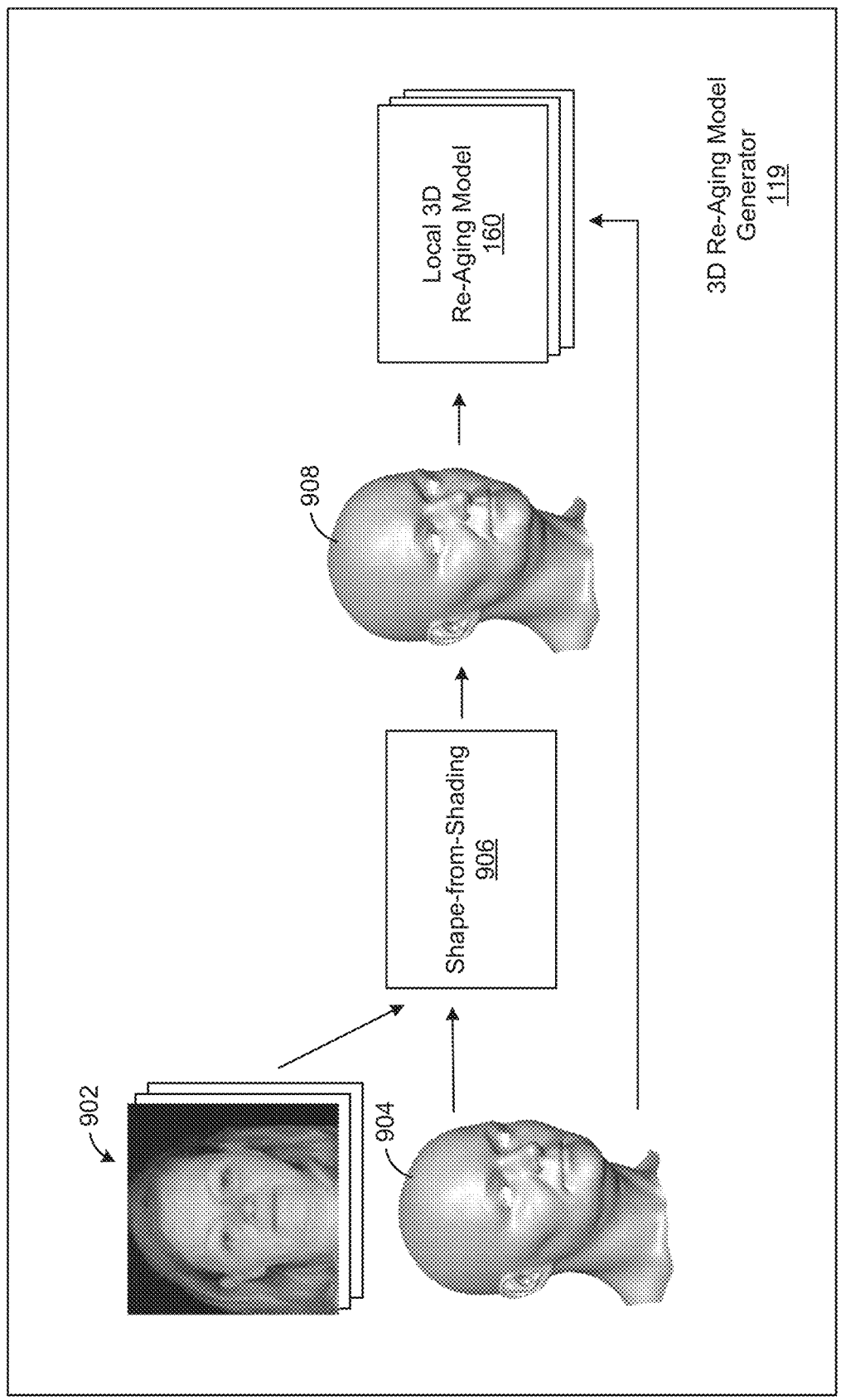
FIG. 9 illustrates an approach for learning the local 3D re-aging models of FIG. 1, according to various embodiments.

FIG. 9 illustrates an approach for learning the local 3D re-aging models 160 of FIG. 1, according to various embodiments. As shown, a shape-from-shading module 906 of the 3D re-aging model generator 119 applies a shape-from-shading technique to determine a deformation of an input geometry 904 into a re-aged geometry 908 based on re-aged images of the facial identity generated using the re-aging model 150, described above in conjunction with FIGS. 2-7. Shape-from-shading is the process of determining local 3D surface shapes from observed shading in images, such as the re-aged images 902, particularly when illumination conditions are known. When the face of a user is captured using facial capture setups, the illumination (environment map) and appearance maps corresponding to the original-age face (e.g., diffuse and specular albedo maps) are oftentimes known. Given the original-age 3D geometry 904, an albedo map, the known lighting, and the original and re-aged 2D images, an optimization problem can be solved, using well-known shape-from-shading techniques, to determine a deformation surface (e.g., the re-aged geometry 908) that explains the re-aged images given the illumination and appearance maps. For example, in some embodiments, the optimization can be solved using a differential renderer. As another example, in some embodiments, the shape-from-shading technique can employ an artificial neural network, such as a U-Net model, that translates the re-aged 2D images into images of normals, which can in turn be used to deform the 3D geometry 904. Accordingly, the 2D re-aged images can be "lifted" to 3D using shape-from shading techniques. In addition, re-aged geometries can be generated for multiple facial identities, and patches from each those re-aged geometries can be included in the set of blend shapes in a blendshape model that is used as the local 3D re-aging model 160 for that patch.

Figure 10:
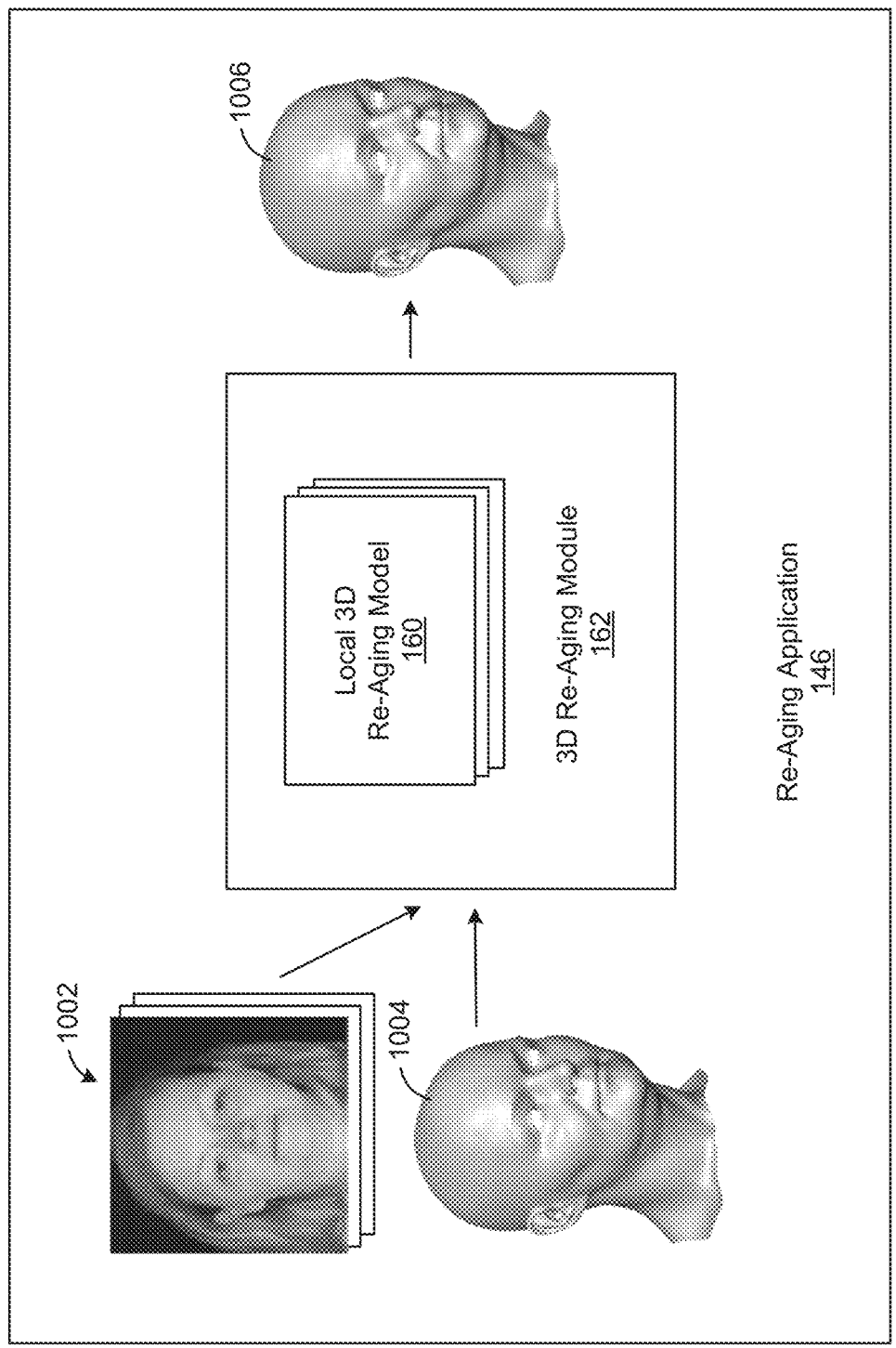
FIG. 10 illustrates how the 3D re-aging module of FIG. 1 operates, according to various other embodiments.

FIG. 10 illustrates how the 3D re-aging module 162 of FIG. 1 operates, according to other various embodiments. As shown, in some embodiments, the 3D re-aging module 162 receives a set of re-aged images 1002 of a face from different viewpoints and 3D geometry 1004 associated with the face. For example, cameras could be set up to capture the face from different viewpoints, and the captured images can then be re-aged using the re-aging model 150 to generate the set of re-aged images 1002. In addition, the captured images from different viewpoints can be used to generate the 3D geometry 1004 using well-known techniques.

Given the set of re-aged images 1002 of the facial identity and the 3D geometry 1004 associated with the facial identity, the 3D re-aging module 162 can perform a shape-from-shading technique to determine a deformation of the input geometry 1004 into a re-aged geometry 1006 based on the re-aged images 1002 of the same facial identity, similar to the description above in conjunction with FIG. 9. In some embodiments, the shape-from-shading technique is constrained by the blendshape models used as local 3D re-aging models 160. In such cases, for each patch, the 3D re-aging module 162 can determine a deformation of the patch from the 3D geometry 1004 that matches a corresponding portion of the re-aged images 1002 using a shape-from-shading technique that is limited to solutions that are linear combinations of the same patch from 3D geometries of sample faces that are used as blend shapes in the blendshape model, described above in conjunction with FIG. 9. Limiting the solutions to linear combinations of the same patch from the 3D geometries of sample faces helps to ensure that the shape-from-shading technique does not produce unrealistic results that do not look plausible. After generating the re-aged patches, the re-aging module 162 can combine the re-aged patches to generate the re-aged geometry 1006. Thereafter, the re-aged geometry 1006 can be used to render images of the re-aged face, among other things.

Figure 11:
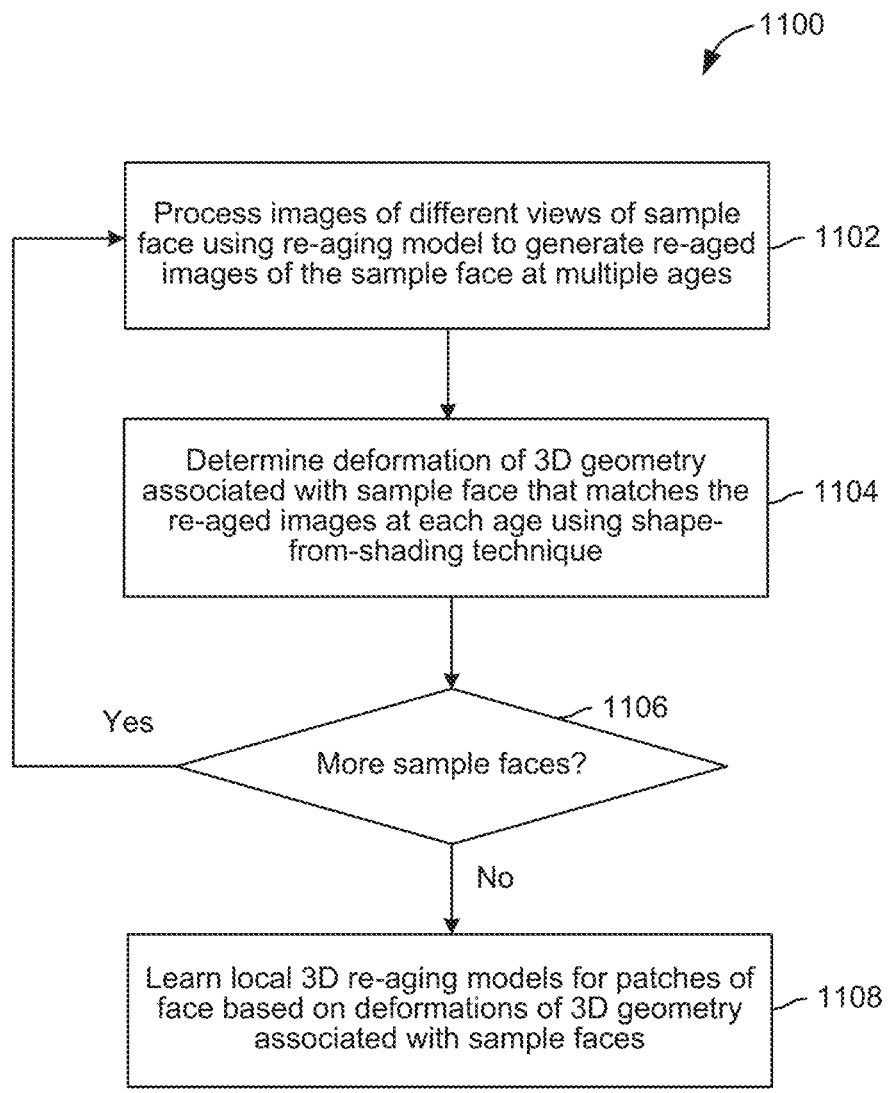
FIG. 11 sets forth a flow diagram of method steps for learning local 3D re-aging models, according to various embodiments.

FIG. 11 sets forth a flow diagram of method steps for learning local 3D re-aging models, according to various embodiments. Although the method steps are described in conjunction with the systems of FIGS. 1 and 9, persons of ordinary skill in the art will understand that any system configured to perform the method steps, in any order, is within the scope of the present disclosure.

As shown, a method 1100 begins at step 1102, where the 3D re-aging model generator 119 processes images of different views of a sample face having a particular facial identity using the re-aging model 150 to generate re-aged images of the sample face at multiple ages. In some embodiments, the method 700 described above in conjunction with FIG. 7 can be performed to process the images of different views of the sample face. The images of the different views of the sample face can be obtained in any technically feasible manner, such as using a facial capture system.

At step 1104, the 3D re-aging model generator 119 determines a deformation of 3D geometry associated with the sample face that matches the re-aged images at each of the multiple ages using a shape-from-shading technique. Any technically feasible shape-from-shading technique can be used in some embodiments, such as the optimization problem that is solved using a differential renderer or the U-Net model that translates the re-aged 2D images into images of normals that can be used to deform 3D geometry, described above in conjunction with FIG. 9.

At step 1106, if there are additional sample faces, then the method 1100 returns to step 1102, where the 3D re-aging model generator 119 processes images of different views of another sample face having a different facial identity using the re-aging model 150 to generate re-aged images of the other sample face at multiple ages.

On the other hand, if there are no additional sample faces having different facial identities, then at step 1108, the re-aging application 146 learns local 3D re-aging models for patches of a face based on deformations of 3D geometry associated with sample faces.

Figure 12:
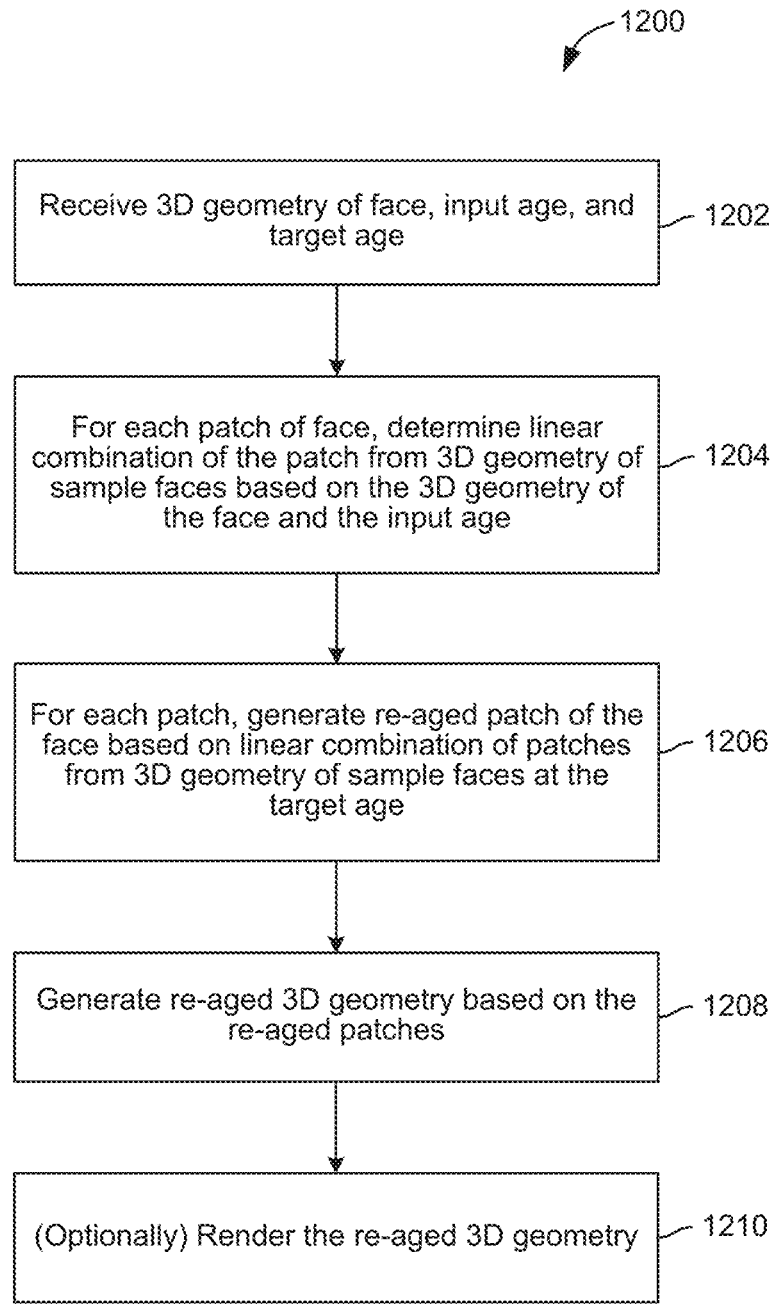
FIG. 12 sets forth a flow diagram of method steps for re-aging 3D geometry of a face, according to various embodiments.

FIG. 12 sets forth a flow diagram of method steps for re-aging 3D geometry of a face, according to various embodiments. Although the method steps are described in conjunction with the systems of FIGS. 1 and 8, persons of ordinary skill in the art will understand that any system configured to perform the method steps, in any order, is within the scope of the present disclosure.

As shown, a method 1200 begins at step 1202, where the re-aging application 146 receives a 3D geometry of the face, an input age, and a target age. The 3D geometry of the face can be obtained in any technically feasible manner, such as using a facial capture system.

At step 1204, for each patch of the face, the re-aging application 146 determines a linear combination of the same patch from 3D geometries of sample faces based on the 3D geometry of the face and the input age. As described, the linear combination can be determined in any technically feasible manner, such as based on surface curvature of the patches being compared or silhouettes in images of the patches, or other measures used in fitting 3D geometry models.

At step 1206, for each patch of the face, the re-aging application 146 generates a re-aged patch of the face based on a linear combination of patches from 3D geometries of sample faces at the target age (i.e., sample patches at the target age). The same linear combination determined at step 1204 is used to generate the re-aged patch of the face at step 1204 using the patches from the 3D geometries of sample faces at the target age.

At step 1208, the re-aging application 146 generates the re-aged 3D geometry based on the re-aged patches. In some embodiments, the re-aging application 146 can combine the re-aged patches to generate the re-aged 3D geometry.

At step 1210, the re-aging application 146 optionally renders the re-aged 3D geometry. For example, the re-aging application 146 could render one or more standalone images or frames of a video using the re-aged 3D geometry.

Figure 13:
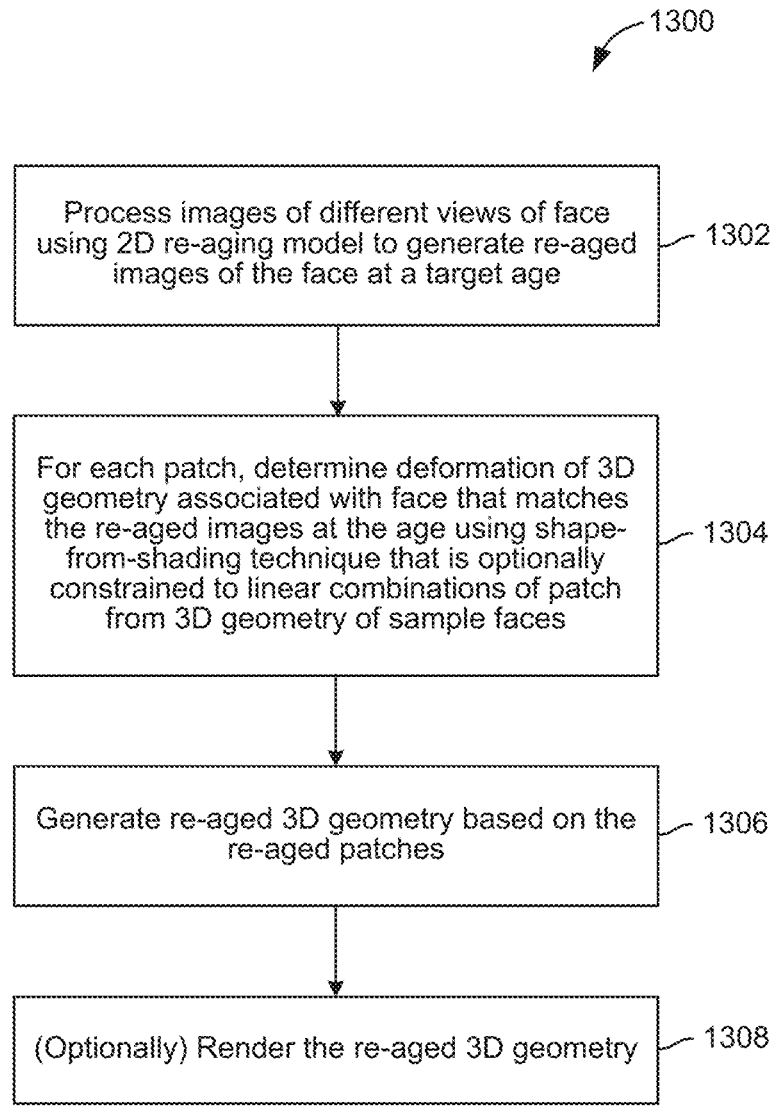
FIG. 13 sets forth a flow diagram of method steps for re-aging 3D geometry of a face, according to various other embodiments.

FIG. 13 sets forth a flow diagram of method steps for re-aging 3D geometry of a face, according to various other embodiments. Although the method steps are described in conjunction with the systems of FIGS. 1 and 10, persons of ordinary skill in the art will understand that any system configured to perform the method steps, in any order, is within the scope of the present disclosure.

As shown, a method 1300 begins at step 1302, where the re-aging application 146 processes images of different views of a face using the re-aging model 150 to generate re-aged images of the face at a target age. Similar to step 1102 of the method 1100, described above in conjunction with FIG. 11, the images of the different views of the face can be obtained in any technically feasible manner, such as using a facial capture system.

At step 1304, for each patch, the re-aging application 146 determines a deformation of a 3D geometry associated with the face that matches the re-aged images at the age using a shape-from-shading technique that is, optionally, constrained to linear combinations of patches from 3D geometries of sample faces. Any technically feasible shape-from-shading technique can be used in some embodiments, such as the optimization problem that is solved using a differential renderer or the U-Net model that translates the re-aged 2D images into images of normals that can be used to deform 3D geometry, described above in conjunction with FIG. 9. Constraining the shape-from-shading technique to linear combinations of patches from the 3D geometries of sample faces can help to ensure that results produced by the shape-from-shading technique are realistic.

At step 1306, the re-aging application 146 generates the re-aged 3D geometry based on the re-aged patches. Similar to step 1208 of the method 1200, described above in conjunction with FIG. 12, the re-aging application 146 can combine the re-aged patches to generate the re-aged 3D geometry in some embodiments.

At step 1308, the re-aging application 146 optionally renders the re-aged 3D geometry to generate one or more images of the re-aged face. Similar to step 1210 of the method 1200, described above in conjunction with FIG. 12, the re-aging application 146 can render one or more standalone images or frames of a video using the re-aged 3D geometry.

In sum, techniques are disclosed for re-aging images of faces and 3D geometry representing faces. In some embodiments, 2D re-aging is performed by inputting an image of a face, an input age, and a target age, into a re-aging model that outputs a re-aging delta image. The re-aging delta image can then be combined with the input image to generate a re-aged image of the face. The re-aging model can include a U-Net architecture or a variant thereof in some embodiments. In some embodiments, the re-aging model is trained using a sample of synthetic images at various ages generated using pre-trained generative and re-aging models. In some embodiments, 3D geometry representing a face is re-aged using local 3D re-aging models that each include a blendshape model for finding a linear combination of sample patches from geometries of different facial identities and generating a new shape for the patch at a target age based on the same linear combination of sample patches at the target age. The new shapes for the patches can then be combined into a re-aged 3D geometry. In some embodiments, 3D geometry representing a face is re-aged by performing a shape-from-shading technique using re-aged images of the face captured from different viewpoints, and the shape-from shading technique can optionally be constrained to linear combinations of sample patches from 3D geometries of different faces in local blendshape models.

At least one technical advantage of the disclosed techniques relative to the prior art is that the disclosed techniques enable images and video frames that include faces and 3D geometry representing faces to be automatically re-aged while preserving the identities of those faces more accurately than conventional re-aging techniques. In addition, the disclosed techniques for re-aging faces can be effective for input images and video frames with varying depths and positions of the head, as well as different head poses, changes in lighting conditions, and motions. These technical advantages represent one or more technological improvements over prior art approaches.

1. In some embodiments, a computer-implemented method for re-aging a face included in a first image comprises generating, via a machine learning model, a second image based on (i) the first image that includes the face, (ii) an input age, and (iii) a target age, wherein the second image includes one or more differences from the first image, and combining the first image and the second image into a third image.

2. The computer-implemented method of clause 1, further comprising training the machine learning model based on a first set of images of a plurality of facial identities at a plurality of ages.

3. The computer-implemented method of clauses 1 or 2, further comprising generating the first set of images by generating, via a first pre-trained machine learning model, a second set of images of the plurality of facial identities, and generating, via a second pre-trained machine learning model, the first set of images based on the second set of images.

4. The computer-implemented method of any of clauses 1-3, wherein training the machine learning model comprises minimizing a loss function that comprises a L1 loss, a perceptual loss, and an adversarial loss.

5. The computer-implemented method of any of clauses 1-4, wherein the machine learning model comprises a U-Net architecture.

6. The computer-implemented method of any of clauses 1-5, wherein the input age is specified using a fourth image that comprises one or more pixels indicating the input age, and the target age is specified using a fifth image that comprises one or more pixels indicating the target age.

7. The computer-implemented method of any of clauses 1-6, further comprising generating a segmented image indicating a plurality of pixels included in the first image that correspond to skin of the face, wherein the one or more pixels indicating the input age in the fourth image and the one or more pixels indicating the target age in the fifth image correspond to one or more pixels in the plurality of pixels included in the first image.

8. The computer-implemented method of any of clauses 1-7, wherein the fifth image further comprises one or more pixels indicating at least one other target age.

9. The computer-implemented method of any of clauses 1-8, wherein the target age is injected via a layer modulation technique.

10. The computer-implemented method of any of clauses 1-9, further comprising determining a deformation of three-dimensional geometry representing the face based on the third image.

11. In some embodiments, a computer-implemented method for re-aging three-dimensional (3D) geometry representing a face comprises generating, via a machine learning model, a first image that includes a face at a target age based on a second image that includes the face at an input age, and deforming a 3D geometry representing the face at the input age based on the first image to generate a re-aged 3D geometry.

12. The computer-implemented method of clause 11, wherein the 3D geometry is deformed via a shape-from-shading technique based on the first image.

13. The computer-implemented method of clauses 11 or 12, wherein the shape-from-shading technique is constrained based on 3D geometries representing other faces at the target age.

14. The computer-implemented method of any of clauses 11-13, wherein the shape-from-shading technique uses at least one of a differential renderer or a machine learning model that comprises a U-Net architecture.

15. The computer-implemented method of any of clauses 11-14, further comprising generating a blendshape model based on (i) the 3D geometry, (ii) the re-aged 3D geometry, and (iii) at least one other 3D geometry and at least one other corresponding re-aged 3D geometry.

16. The computer-implemented method of any of clauses 11-15, further comprising generating another 3D geometry representing another face using the blendshape model.

17. The computer-implemented method of any of clauses 11-16, further comprising training the machine learning model based on a data set comprising images of a plurality of facial identities at a plurality of ages.

18. The computer-implemented method of any of clauses 11-17, further comprising rendering at least one of an image or a frame of a video based on the re-aged 3D geometry.

19. In some embodiments, one or more non-transitory computer-readable storage media include instructions that, when executed by one or more processing units, cause the one or more processing units to perform steps for re-aging a face included in a first image, the steps comprising generating, via a machine learning model, a second image based on (i) the first image that includes the face, (ii) an input age, and (iii) a target age, wherein the second image includes one or more differences from the first image, and combining the first image and the second image into a third image.

20. The one or more non-transitory computer-readable storage media of clause 19, wherein the instructions, when executed by the one or more processing units, further cause the one or more processing units to perform steps comprising generating a first set of images of a plurality of facial identities at a plurality of ages by generating, via a first pre-trained machine learning model, a second set of images of the plurality of facial identities, and generating, via a second pre-trained machine learning model, the first set of images based on the second set of images, and training the machine learning model based on the first set of images.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for re-aging a face included in a first image, the method comprising:
   generating an input age image corresponding to an input age associated with the face in the first image and a target age image associated with a target age of the face in the first image, wherein the input age image includes a first plurality of pixels having age values indicating the input age and the target age image includes a second plurality of pixels having age values indicating the target age, and wherein the first image, the input age image, and the target age image have the same spatial resolution;
   generating, via a machine learning model, a second image based on a multi-channel tensor provided to the machine learning model at execution, wherein the multi-channel tensor comprises (i) the first image that includes the face, (ii) an input age image, and (iii) a target age image, wherein the second image includes one or more differences from the first image; and
   combining the first image and the second image into a third image.

2. The computer-implemented method of claim 1, further comprising:
   training the machine learning model based on a first set of images of a plurality of facial identities at a plurality of ages.

3. The computer-implemented method of claim 2, further comprising generating the first set of images by:
   generating, via a first pre-trained machine learning model, a second set of images of the plurality of facial identities; and
   generating, via a second pre-trained machine learning model, the first set of images based on the second set of images.

4. The computer-implemented method of claim 2, wherein training the machine learning model comprises minimizing a loss function that comprises a L1 loss, a perceptual loss, and an adversarial loss.

5. The computer-implemented method of claim 1, wherein the machine learning model comprises a U-Net architecture.

6. The computer-implemented method of claim 1, further comprising:
   generating a segmented image indicating a plurality of pixels included in the first image that correspond to skin of the face,
   wherein the one or more pixels indicating the input age in the fourth image and the one or more pixels indicating the target age in the fifth image correspond to one or more pixels in the plurality of pixels included in the first image.

7. The computer-implemented method of claim 1, wherein the fifth image further comprises one or more pixels indicating at least one other target age.

8. The computer-implemented method of claim 1, wherein the target age is injected via a layer modulation technique.

9. The computer-implemented method of claim 1, further comprising:
determining a deformation of three-dimensional geometry representing the face based on the third image.

10. The computer-implemented method of claim 1, further comprising training a second machine learning model based on the third image, wherein, subsequent to training, the second machine learning model generates an output image including a given face at a given target age based on an input image of the given face at a given input age.

11. The computer-implemented method of claim 10, wherein a 3D geometry representing the given face at the given input age is deformed based on the output image to generate a re-aged 3D geometry.

12. One or more non-transitory computer-readable storage media including instructions that, when executed by one or more processing units, cause the one or more processing units to perform steps for re-aging a face included in a first image, the steps comprising:
generating an input age image corresponding to an input age associated with the face in the first image and a target age image associated with a target age of the face in the first image, wherein the input age image includes a first plurality of pixels having age values indicating the input age and the target age image includes a second plurality of pixels having age values indicating the target age, and wherein the first image, the input age image, and the target age image have the same spatial resolution;
generating, via a machine learning model, a second image based on a multi-channel tensor provided to the machine learning model at execution, wherein the multi-channel tensor comprises (i) the first image that includes the face, (ii) an input age image, and (iii) a target age image, wherein the second image includes one or more differences from the first image; and
combining the first image and the second image into a third image.

13. The one or more non-transitory computer-readable storage media of claim 12, wherein the instructions, when executed by the one or more processing units, further cause the one or more processing units to perform steps comprising:
generating a first set of images of a plurality of facial identities at a plurality of ages by:
generating, via a first pre-trained machine learning model, a second set of images of the plurality of facial identities, and
generating, via a second pre-trained machine learning model, the first set of images based on the second set of images; and
training the machine learning model based on the first set of images.

* * * * *

UNITED STATES PATENT AND TRADEMARK OFFICE
CERTIFICATE OF CORRECTION

PATENT NO. : 12,307,616 B2
APPLICATION NO. : 17/473232
DATED : May 20, 2025
INVENTOR(S) : Gaspard Zoss et al.

It is certified that error appears in the above-identified patent and that said Letters Patent is hereby corrected as shown below:

In the Specification

In Column 8, Line 58, delete "$z<_{L1}$" and insert -- $\mathcal{L}_{L1}$ --.

In Column 8, Line 59, delete "$z<_{LPIPS}$" and insert -- $\mathcal{L}_{LPIPS}$ --.

In Column 8, Line 59, delete "$z<_{Adv}$" and insert -- $\mathcal{L}_{Adv}$ --.

Signed and Sealed this
Sixteenth Day of September, 2025

Coke Morgan Stewart
*Acting Director of the United States Patent and Trademark Office*